(12) United States Patent
Chen et al.

(10) Patent No.: US 11,089,160 B1
(45) Date of Patent: Aug. 10, 2021

(54) PEER-TO-PEER VOIP

(71) Applicants: Eli Chen, San Mateo, CA (US); Anand Janefalkar, San Francisco, CA (US)

(72) Inventors: Eli Chen, San Mateo, CA (US); Anand Janefalkar, San Francisco, CA (US)

(73) Assignee: UJET, Inc., San Francisco, CA (US)

( * ) Notice: Subject to any disclaimer, the term of this patent is extended or adjusted under 35 U.S.C. 154(b) by 0 days.

(21) Appl. No.: 15/666,129

(22) Filed: Aug. 1, 2017

Related U.S. Application Data

(63) Continuation-in-part of application No. 15/220,317, filed on Jul. 26, 2016, and a continuation-in-part of
(Continued)

(51) Int. Cl.
*H04M 3/523* (2006.01)
*H04L 29/06* (2006.01)
(Continued)

(52) U.S. Cl.
CPC ........ *H04M 3/5231* (2013.01); *G06Q 30/016* (2013.01); *H04L 63/0884* (2013.01);
(Continued)

(58) Field of Classification Search
None
See application file for complete search history.

(56) References Cited

U.S. PATENT DOCUMENTS 5,206,903 A  4/1993 Kohlet et al.
6,404,747 B1  6/2002 Berry et al.
(Continued)

FOREIGN PATENT DOCUMENTS

EP  1033860 A2  9/2000

OTHER PUBLICATIONS

Elliott, Colm. "Stream Synchronization for Voice over IP Conference Bridges", Nov. 2004 [retrieved on Jan. 17, 2019], Retrieved from the Internet: <URL:https://pdfs.semanticscholar.org/0b29/eb04873e19b045ca5afa8a7624ac43b76692.pdf>. (Year: 2004).*
(Continued)

*Primary Examiner* — Kevin T Bates
*Assistant Examiner* — Dae Kim
(74) *Attorney, Agent, or Firm* — Rimon Law, P.C.

(57) ABSTRACT

A Voice over Internet Protocol (VoIP) system is configured for direct communications between remote computing devices in a peer-to-peer configuration. Voice data from the communication is marked such that the voice data from the different endpoints can be combined into a unified audio stream. An authentication may be accomplished automatically prior to text or audio communication between a customer and a service agent. In some embodiments, authentication is accomplished automatically by authentication of the remote access device or accomplished by asking the customer questions. A single authentication of the remote access device may be used to authenticate a service request transferred between service agents. The authentication of the remote device may include, for example, use of a personal identification number, a fingerprint, a photograph, and/or a hardware identifier.

22 Claims, 8 Drawing Sheets

Related U.S. Application Data application No. 15/144,765, filed on May 2, 2016, now Pat. No. 10,152,718, and a continuation-in-part of application No. 14/798,468, filed on Jul. 14, 2015, and a continuation-in-part of application No. 14/831,129, filed on Aug. 20, 2015, now Pat. No. 9,838,533, and a continuation-in-part of application No. 14/850,142, filed on Sep. 10, 2015, now Pat. No. 10,108,965, and a continuation-in-part of application No. 15/008,301, filed on Jan. 27, 2016, now abandoned, and a continuation-in-part of application No. 15/220,339, filed on Jul. 26, 2016, now Pat. No. 10,356,091, and a continuation-in-part of application No. 15/660,877, filed on Jul. 26, 2017, now abandoned.

(51) Int. Cl.
  *G06Q 30/00* (2012.01)
  *H04M 3/51* (2006.01)
  *H04L 29/08* (2006.01)

(52) U.S. Cl.
  CPC ........ *H04L 63/101* (2013.01); *H04L 67/1091* (2013.01); *H04M 3/5191* (2013.01)

(56) References Cited

U.S. PATENT DOCUMENTS

| | | | |
|---|---|---|---|
| 6,665,395 B1 | 12/2003 | Busey et al. | |
| 6,963,353 B1* | 11/2005 | Firestone | H04N 7/147 348/14.08 |
| 6,996,626 B1* | 2/2006 | Smith | H04L 29/06027 370/352 |
| 8,594,302 B2 | 11/2013 | Youd et al. | |
| 8,643,696 B2* | 2/2014 | Kee | H04N 21/4622 348/14.08 |
| 9,325,661 B2 | 4/2016 | Geppert et al. | |
| 9,407,758 B1 | 8/2016 | Pycko et al. | |
| 9,721,087 B1 | 8/2017 | Duchin et al. | |
| 2004/0062204 A1* | 4/2004 | Bearden | H04M 3/301 370/250 |
| 2004/0267751 A1* | 12/2004 | Dill | G06F 17/30539 |
| 2007/0025325 A1* | 2/2007 | Kumar | H04L 47/2416 370/350 |
| 2007/0109978 A1* | 5/2007 | Miriyala | H04L 12/1813 370/260 |
| 2008/0288276 A1* | 11/2008 | Harris | G06Q 30/02 705/7.32 |
| 2009/0067603 A1* | 3/2009 | Mohler | H04M 3/42374 379/202.01 |
| 2010/0231469 A1 | 9/2010 | Kim | |
| 2011/0010459 A1* | 1/2011 | Stokking | H04L 65/104 709/231 |
| 2011/0206198 A1* | 8/2011 | Freedman | G06Q 30/06 379/265.03 |
| 2012/0300769 A1* | 11/2012 | Narbutt | H04L 65/608 370/352 |
| 2013/0033563 A1* | 2/2013 | Fullea Carrera | H04L 12/1822 348/14.02 |
| 2013/0287202 A1 | 10/2013 | Flockhart et al. | |
| 2013/0301706 A1 | 11/2013 | Qiu et al. | |
| 2015/0120648 A1* | 4/2015 | Slovacek | G06F 17/3002 707/609 |
| 2015/0237252 A1 | 8/2015 | O'Donnell et al. | |
| 2015/0244658 A1* | 8/2015 | Speyer | H04L 12/1827 709/206 |
| 2015/0371350 A1* | 12/2015 | Zebarjadi | G06F 19/327 705/2 |
| 2016/0005049 A1* | 1/2016 | Menezes | G06Q 30/016 705/7.28 |

OTHER PUBLICATIONS

Smith, P. "Voice Conferencing over IP Networks", McGill University, Jan. 18, 2002 [retrieved on Sep. 25, 2020], Retrieved from the Internet: <URL: http://www.mmsp.ece.mcgill.ca/Theses/2002/SmithT2002.pdf>. (Year: 2002).*
PCT/US17/55429, ISR and WO dated Jan. 29, 2018.
WebRTC homepage, https://webrtc.org/, Jun. 26, 2017.

* cited by examiner

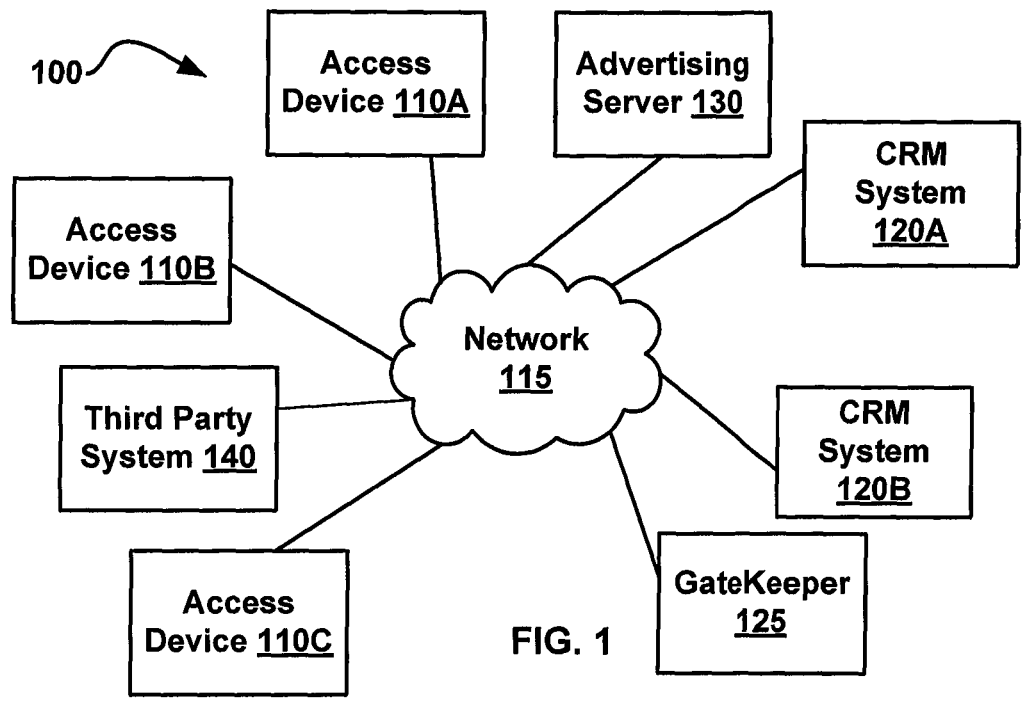
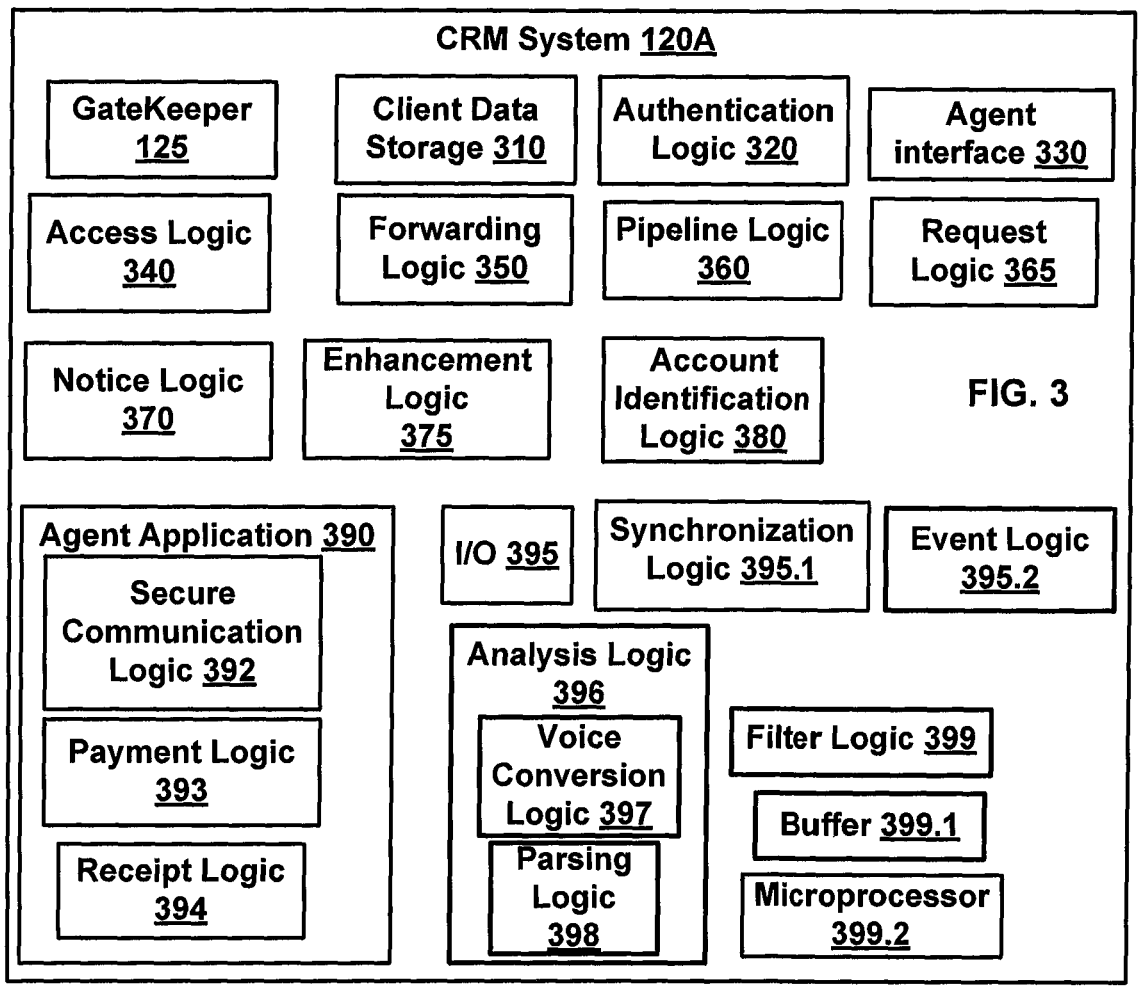

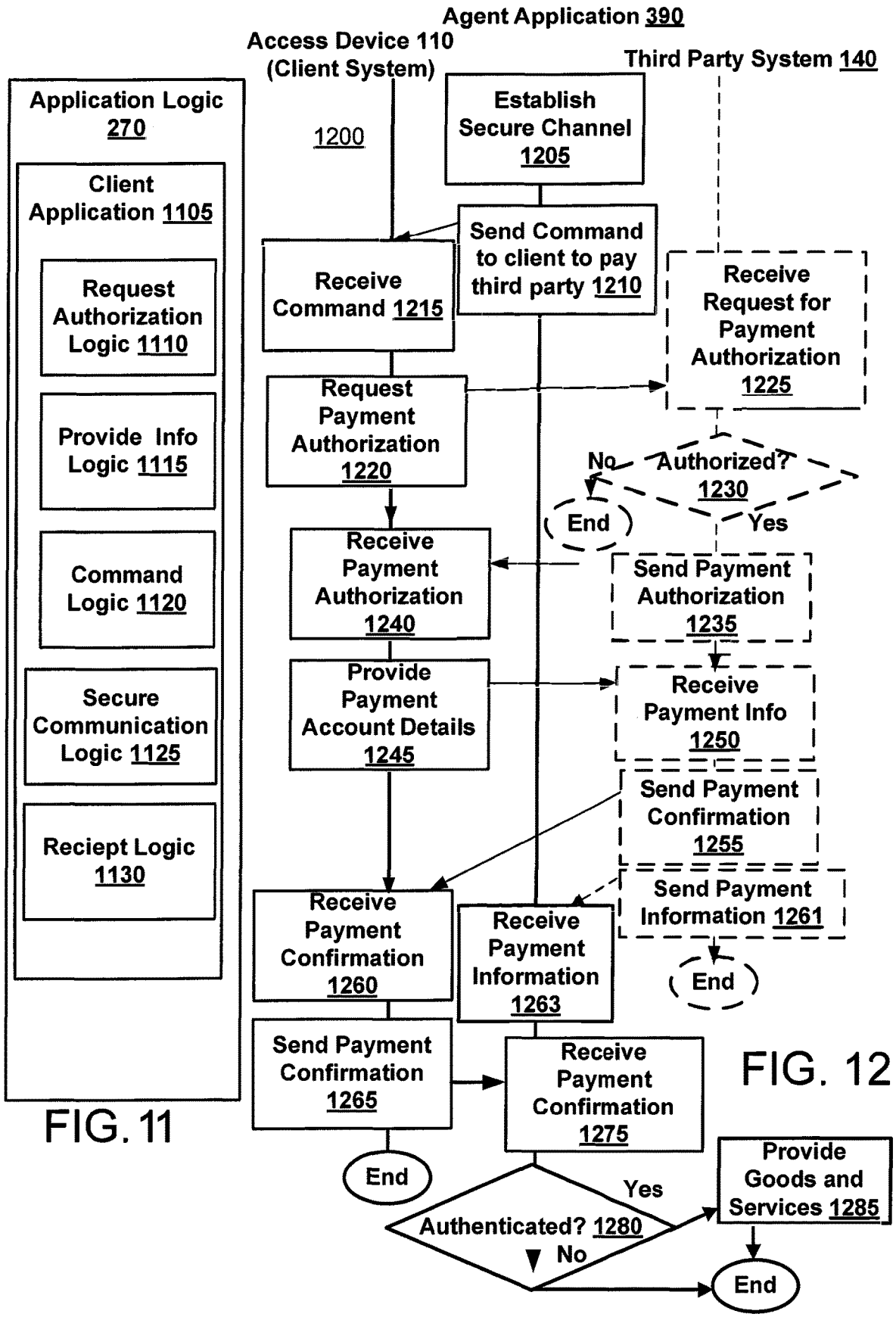

PEER-TO-PEER VOIP

CROSS-REFERENCE TO RELATED APPLICATIONS

This application is a continuation-in-part of non-provisional patent application Ser. No. 15/220,339 filed Jul. 26, 2016; this application is a continuation in part of non-provisional patent application Ser. No. 15/220,317 filed Jul. 26, 2016; this application is a continuation-in-part of non-provisional patent application Ser. No. 15/144,765 filed May 2, 2016; a continuation-in-part of non-provisional patent application Ser. No. 14/798,468 filed. Jul. 14, 2015; a continuation-in-part of non-provisional patent application Ser. No. 14/831,129 filed Aug. 20, 2015; a continuation-in-part of non-provisional patent application Ser. No. 14/850,142 filed Sep. 10, 2015; and a continuation-in-part of non-provisional patent application Ser. No. 15/008,301 filed Jan. 27, 2016; this application is a continuation-in-part of Ser. No. 15/660,877 filed Jul. 26, 2017. The disclosures of these applications are hereby incorporated herein by reference.

BACKGROUND

Field of the Invention

The invention is in the field of communications and more specifically in the field of peer-to-peer voice over Internet Protocol communications.

Related Art

Voice communications is a successful application of the internet. It is common to have voice and/or video communications between two or more parties. However, such communications are typically processed through a central server, which can result in delays and bandwidth limitations.

SUMMARY

A Voice over Internet Protocol (VoIP) system is configured to operate directly between remote computing devices in a peer-to-peer configuration. Synchronization between clocks at each of the communication endpoints is used to mark voice data such that the voice data from the different endpoints can be combined into a unified audio stream. Although some of the processing of the recording of the call may occur at a server, the communications between the customer service agent and the customer does not need to be routed through the server.

The VoIP system is optionally used to support communications between a customer and a customer service agent at a customer relationship management system. The VoP system may communicate text, images and/or other data in addition to voice. In these and other embodiments, the VoIP system optionally includes features such as "sentiment detection" to determine if a user is upset, happy or angry, filtering of personal identifiable information (PII), real-time feedback to a customer service agent, event tracking, and/or the like.

A customer relationship management (CRM) system includes logic with which a human customer service agent can request a payment from a customer, without the customer service agent receiving confidential information of the customer. This greatly increases the security and convenience of payments.

The customer service agent is provided with a customer communication system configured to provide the customer service agent with an agent interface and optionally configured to automatically authenticate customer devices. The agent interface includes a "request payment" control that allows the customer service agent to request a payment from a customer. This control is configured to send a command to a client of the customer that causes a customer interface to present the request to the customer. The command typically includes a payment amount and an address of a third party payment processor. At the customer client the customer is requested to provide payment approval and/or payment information, e.g., credit card account data. This information is then communicated, not to the customer communication system of the customer service agent, but rather to the third party payment processor.

Confirmation of the payment is sent from the third party payment processor back to the customer client, and then forwarded from the customer client to the customer communication system. Data concerning the payment may also be sent directly from the third party payment processor to the customer communication system of the customer service agent. This data may be matched to the confirmation of the payment to further confirm that all parties are confirmed on the transaction. Once the confirmation of the payment is received by the customer service agent, goods and services may be provided to the customer as desired.

As is described further herein, the various communications involved in making of a payment are optionally associated with authentication certificates and/or are encrypted such that integrity of the communications can be authenticated. Further, the systems and methods of processing payments, as disclosed herein, may be adapted to systems other than those specifically designed for customer relationship management.

The process of authenticating a caller is facilitated using capabilities of a client device. In some embodiments, the authentication of the caller is achieved by automatically authenticating the client device. The authentication of the client device is optionally accomplished by communicating data stored or entered on the client device. This data may include personal identification numbers, passwords, biometric data, and/or the like. The authentication processes can be applied to text, voice and/or video communication between a customer and a customer service agent.

Some aspects of the invention are configured for management of communication channels between client devices and customer service systems. For example, if a user contacts a customer service system using a cellular telephone and an 800 telephone number, the initial contact may be made over a cellular telephone network and be associated with a caller ID number. The Caller ID number is then used to communicate back to the cellular telephone and control an application executing therein. This application may then be used to open a second communication channel having enhanced functionality. In this way an initial contact via a limited communication channel (e.g., a PTSN) can be enhance to occur over a more functional communication channel (e.g., the internet). The enhanced functionality is optionally used for authentication and/or customer services. However, the management of communication channels as taught herein can be applied to applications other than customer service.

Various embodiments of the invention include a customer communication system comprising: a gatekeeper configured to receive digital identification data and to ratify the digital identification data by comparing the digital identification data to previously stored customer authentication data; and a customer relationship management system configured to receive a customer service request from an access device and to connect the customer service request to an agent interface, the customer relationship management system including authentication logic configured to authenticate a source of the customer service request using at least two methods, the two methods including: a) providing questions to the agent interface and ratifying responses to the questions and b) providing digital identification data received from the source of the customer service request to the gatekeeper and receiving an automated ratification of the digital identification data from the gatekeeper, the customer relationship management system being further configured to provide secure customer data to the agent interface only after the authentication of the source of the customer service request.

Various embodiments of the invention include an access device comprising: a display; a user input; an input/output configured to initiate communication to a customer relationship management system; an authentication agent configured to receive an authentication request from a customer relationship management system and to automatically provide digital identification data to a gatekeeper in response to the authentication request, wherein the authentication request includes an identifier of the customer relationship management system; an access control configured to limit access via the display to the authentication agent; and a processor configured to execute at least the authentication agent.

Various embodiments of the invention include a method of managing a customer service request, the method comprising: receiving the customer service request from a remote access device; automatically sending an authentication request to the access device; receiving digital identification data from the access device in response to the authentication request; providing the digital identification data to a gatekeeper; receiving from the gatekeeper a ratification of the digital identification data; providing permission to discuss or access secure customer data, the permission being provided to an agent interface in response to receiving the ratification, the agent interface being configured for audio, text or video communication between a customer support agent and the access device.

Various embodiments of the invention include a customer relationship management system comprising authentication logic configured to automatically authenticate a source of a customer service request using digital identification data received from the source of the customer service request; and pipeline logic including: agent assignment logic configured to assign a customer service agent to a request pipeline, sorting logic configured to place the customer service request into the request pipeline, and ordering logic configured to maintain an order of customer service requests in the request pipeline.

Various embodiments of the invention include a method of processing a customer service request, the method comprising: receiving a customer service request; authenticating a source of the customer service request; selecting a request pipeline for placement of the customer service request in a request pipeline, the selection being based on the authentication of the source; selecting an advertisement based on the authentication of the source; and providing the service requested in the customer service, provision of the service being based on information only available because the source is authenticated.

Various embodiments of the invention include a communication system comprising: a customer service management system including an agent interface configured for a human agent to initiate a request for information from a customer, and request logic configured to send the request to the customer and to receive a response to the request, the request including a command; and an access device including an I/O configured for the access device to communicate with the customer service management system via a communication system, a display configured to present information to the customer, application logic configured to receive the request from the customer service management system, to activate a user input of the access device in response to the command, to display the information to the customer in response to the command, to receive input from the customer in response to the information, and to send the response to the request to the customer service management system in response to the input from the customer, and a processor configured to execute at least the application logic. The customer service management system and the access device are optionally included independently in different embodiments.

Various embodiments of the invention include a method of processing a customer service request, the method comprising: receiving a request from a remote client; sending a command to an application on the remote client, the application configured to request input from a user of the remote client in response to the command, the command configured to activate a user input device on the remote client and being sent in response to an action by a human agent; receiving the requested input from the remote client in response to the command; and providing a service to the user in response to the requested input.

Various embodiments of the invention include a communication server device comprising an interface. The interface may be an agent interface configured for a human agent to communicate between the agent interface and a remote client. Alternatively, the interface may be an API to computing instructions configured to perform processing in conjunction with an application executing on a remote client. These embodiments further include enhancement logic configured to receive a communication from the remote client via a first communication channel and to execute application logic on the remote client, the application logic being configured to open a second communication channel, optionally using an identifier of the remote client. The second communication channel may be between the remote client and the server device or between a device locally connected to the remote client and the server. The second communication channel optionally includes an enhanced communication functionality relative to the first communication channel. These embodiments optionally further include account identification logic configured to associate the identifier of the remote client with an account of a user of the remote client; and a processer configured to execute at least the enhancement logic.

Various embodiments of the invention include an access device comprising: an I/O configured for the access device to communicate with a remote server via at least a first communication channel and a second communication channel; a display configured to present information to a user of the access device; identification logic configured to send an identifier of the access device to the remote server via the first communication channel; and application logic configured to receive activation data from the remote server. The activation data is configured to open the second communication channel between the access device and the remote server or to open the second communication channel between a device locally connected to the access device and the remote server. The application logic is optionally further configured to communicate an identifier associated with the access device or the locally connected device to the remote server via the second communication channel. These embodiments include a processor configured to execute at least part of the application logic.

Various embodiments of the invention include a method of communicating between a remote client and a server, the method comprising: receiving a first communication from the client at the server, via a first communication channel; identifying the client based on an identifier of the client received via the first communication channel; sending activation data to the client, the activation data being configured to open a second communication channel between the client and the server; receiving a second communication from an application executing on the client, via the second communication channel; and communicating between the client (and/or a device locally connected to the client) and the server via the second communication channel. These embodiments optionally further include authenticating the client or a user of the client using the second communication channel.

Various embodiments of the invention include a payment processing system within a customer relationship management (CRM) system comprising: a client application configured to execute on a client device; the client device including a customer interface and an I/O configured to communicate with remote devices; an agent application including an agent interface and configured (1) to communicate in a secure communication channel between the agent application and the client application, (2) to send a command to the client application via the I/O, the command being configured to (a) initiate a payment to a third party and including a payment amount and an address of the third party, and (b) to receive a confirmation of the payment; and wherein the client application is further configured (1) to receive the command from the agent application, (2) to request payment authorization via the customer interface, and (3) to provide payment account details to the address of the third party, in response to the payment authorization.

Various embodiments of the invention include a payment processing method, within a customer relationship management (CRM) system, the method comprising: establishing, by secure communication logic of an agent interface, a secure channel for an agent application and a client application to communicate, the secure communication channel being associated with a customer relationship management system; sending a command to the client application, via the I/O, the command being configured to initiate a payment to a third party and including a payment amount and an address of the third party; and in response, sending, by a customer interface of the client device, to a third party system, a request for authorization to make a payment; receiving authorization for making the payment; providing payment account details to a network address of the third party, in response to the payment authorization; and receiving a confirmation of the payment at the client application.

Various embodiments of the invention include a communication device comprising: a first audio input configured to receive a first sound signal; first digitization logic configured to generate first sound data by digitizing the received first sound signal; a first clock configured to generate first time data; first sync logic configured to synchronize the first time data and second time data generated on a remote communication device; first marking logic configured to add the first time data to the first sound data; first Packaging logic configured to place the first time data and the first sound data in a first data message, the first data message including an address of the remote communication device; and first communication logic configured to communicate the first data message to the remote communication device, and to receive second sound data from the remote communication device the second sound data including the second time data generated on the remote communication device.

Various embodiments of the invention may include a communication system configured to manage communication between multiple devices, the system comprising: an I/O configured to receive first sound data from a first remote client, and to receive second sound data from a second remote client, the first sound data being associated with first time data and the second sound data being associated with second time data; recording logic configured to combine the first sound data and the second sound data to produce a unified audio stream, the recording logic being configured to use the first and second time data to temporally align the first and second sound data in the unified audio stream; a buffer configured to store the unified audio stream; and filter logic configured to remove personal information from at least the first sound data, the filter logic including voice to text conversion logic and parsing logic.

Various embodiments of the invention a communication system configured to manage communication between multiple devices, the system comprising: an I/O configured to receive first sound data from a first remote client, and to receive second sound data from a second remote client, the first sound data being associated with first time data and the second sound data being associated with second time data; recording logic configured to combine the first sound data and the second sound data to produce a unified audio stream, the recording logic being configured to use the first and second time data to temporally align the first and second sound data in the unified audio stream; a buffer configured to store the unified audio stream; and analysis logic configured to detect sentiment in at least the first sound data, and/or filter logic configured to remove personal information from at least the first sound data, the filter logic includes voice to text conversion logic and parsing logic.

Various embodiments of the invention may include a method for communicating, via a Voice over Internet Protocol (VoIP), the method comprising: receiving, at a first audio input, first sound signal; generating first sound data, by first digitization logic, by digitizing the received first sound signal; generating, by a first clock, first time data; synchronizing, by first sync logic the first time data and second time data generated on a remote communication device; adding, by first marking logic, the first time data to the first sound data; placing, by first Packaging logic, the first time data and the first sound data in a first data message, and including an address of the remote communication device with the first data message; and communicating, by first communication logic, the first data message to the remote communication device and receiving second sound data from the remote communication device, the second sound data including the second time data generated on the remote communication device.

BRIEF DESCRIPTION OF THE DRAWINGS

FIG. 1 illustrates a customer communication system, according to various embodiments of the invention.

FIG. 3 illustrates further details of a customer relationship management system, according to various embodiments of the invention.

FIG. 11 illustrates a block diagram of an embodiment of the Application Logic of FIG. 2.

FIG. 12 illustrates a flowchart for making a secure payment, without the customer service agent being exposed to sensitive client information.

DETAILED DESCRIPTION

Figure 2:
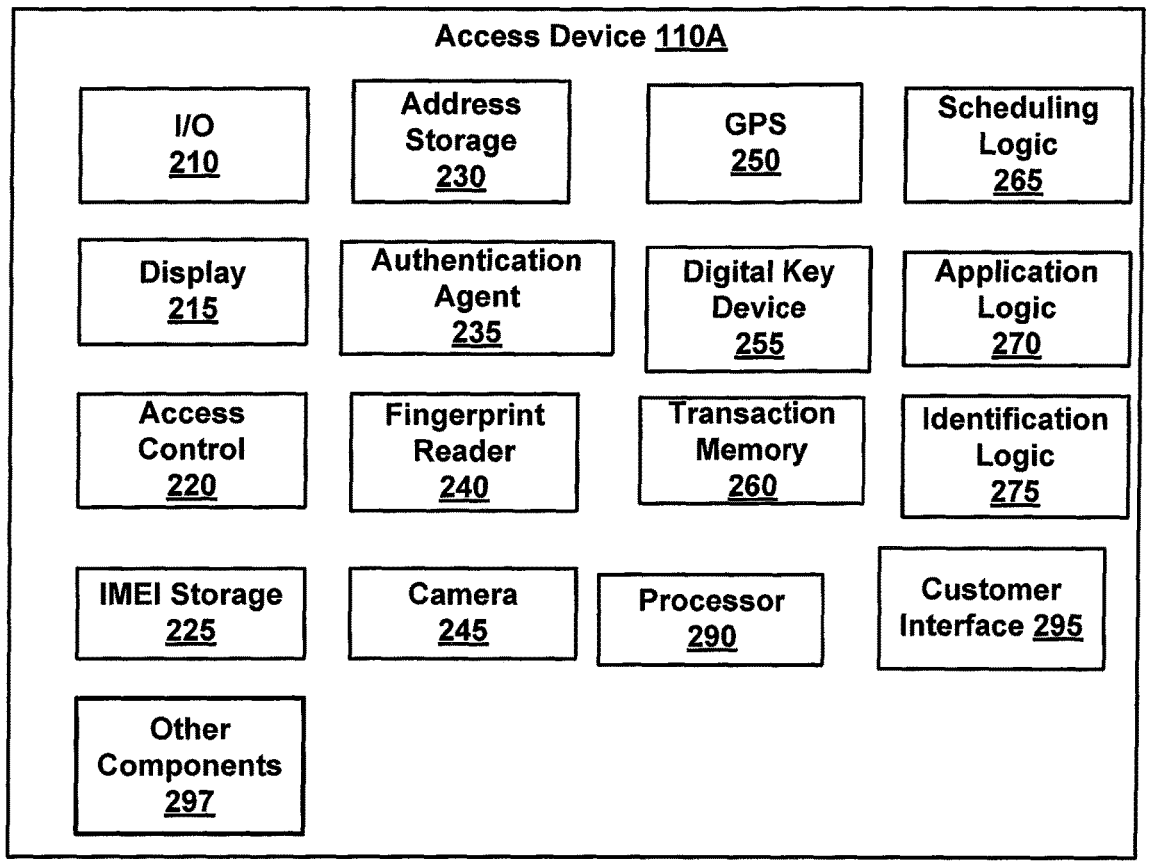
FIG. 2 illustrates further details of an access device, according to various embodiments of the invention.

Customer Relationship Management (CRM) is improved through use of various embodiments of the invention. When using embodiments that include the Peer-to-Peer VoIP communication, the recording of the customer service agent and the customer are combined and may at least in-part be processed by a server, with the call being routed to the server. The customer service agent can receive a computer generated evaluation of the sentiment of the customer, which may be useful in accommodating the customer better. For example, the customer service agent may find it useful to know that just after a particular comment that the customer service agent made it is likely that the customer became disappointed or eager. Also, the customer service agent can receive an immediate evaluation of the customer service agent's performance after each session, so that the customer service agent can make immediate adjustments as to how to interact with customers to achieve the best results.

When using embodiments that include the secure payment processing method and systems, customers are able to make payments without the customer service agent seeing sensitive information that is better kept private, such as credit card numbers, account numbers, bank balances, credit limits, social security numbers, etc.

For example, authentication of the identity of a customer may be automated as an alternative to or in addition to manual authentication by a human customer service agent. The automated authentication typically increases the speed and/or security of the authentication process. As used herein, the phrase "automatic authentication" is an authentication that is performed by a computer and/or communication device without necessarily requiring actions by a customer service agent. In contrast, "manual authentication" is used to refer to authentication that is performed by a service agent, for example, by asking the customer specific questions. Both automatic and manual authentication can include some action performed by the customer, such as entering a Personal Identification Number (PIN) or providing a fingerprint.

FIG. 1 illustrates a Customer Communication System 100, according to various embodiments of the invention. Customer Communication System 100 includes one or more Access Devices 110, (individually labeled 110A, 110B, 110C, etc.). The Access Devices 110 are configured to communicate via a Network 115 with one or more Customer Relationship Management (CRM) Systems 120, (individually labeled 120A, 120B, etc.). Network 115 may be a telephone network, a computer network (e.g., the internet), and/or some other communication network. The communication includes digital data and also optionally analog audio and/or image data. CRM Systems 120 may include features common to traditional CRM systems available from companies such as Salesforce or Zendesk. However, as described further herein, CRM Systems 120 includes additional unique features. In some embodiments, CRM Systems 120 are configured to operate as an interface/shell on top of a traditional CRM system.

A single customer may be associated with more than one of Access Devices 110. For example, the customer may have a phone, a smart phone, a tablet and a personal computer through which they access CRM Systems 120. Any of these devices may be used by the customer to interact with different CRM Systems 120 associated with different enterprises.

Customer Communication System 100 further includes one or more GateKeeper 125. GateKeeper 125 is configured to control (e.g., grant) access to information and resources by ratifying the authenticity of digital identification data. GateKeeper 125 is optionally an integral part of CRM System 120A. However, GateKeeper 125 is illustrated as being separate from CRM System 120A because, in some embodiments, GateKeeper 125 is configured to support multiple CRM Systems 120. For example, in some embodiments, each of CRM Systems 120 includes its own integrated GateKeeper 125.

In typical embodiments, GateKeeper 125 is specifically configured to grant access to secure customer data and/or to grant permission to use the secure customer data. This access is granted to customer service agents at members of CRM Systems 120 and/or to the consumer associated with the customer data. For example, a human customer service agent may only be granted access to secure customer data after the customer and/or customer's Access Device 110A is authenticated. Or, the human customer service agent may have access to the secure customer data and only be granted permission to discuss the secure customer data (with the customer) if the customer and/or customer's Access Device 110A is authenticated. GateKeeper 125 includes logic configured to perform the actions described herein. This logic is embodied in hardware, firmware, and/or software stored on a non-transient computer readable medium. In some embodiments, Gatekeeper 125 includes a microprocessor configured to execute specific computing instructions for ratifying the digital identification data.

Gatekeeper 125 is configured to facilitate authentication of a customer and/or customer's Access Device 110A by automatically comparing digital identification data received at the time of authentication to previously stored customer authentication data. The previously stored customer authentication data is typically provided to Gatekeeper 125 as part of an account establishment or update. The previously stored customer authentication data is optionally received from a source that is automatically or manually authenticated separately. For example, a customer using Access Device 110A may be manually authenticated at the start of a communication session and then the customer authentication data may be received from Access Device 110A during the same communication session. If the digital identification data matches the stored customer authentication data, the digital identification data is considered to be "ratified." A request for ratification of digital identification data is referred to herein as a "ratification request." For example, a ratification request may include sending the digital identification data to GateKeeper 125. A ratification request is distinguished from an "authentication request" which is a request made to an access device for digital identification data.

In various embodiments, the previously stored customer authentication data represents: biometric data, a password, a personal identification number (PIN), fingerprint data, facial data, a rolling code generator, image data, networking data, a mobile equipment identifier (e.g., International Mobile Equipment Identity (IMEI) number or Mobile Equipment ID (MEID), a mobile phone number, a MAC address, an internet protocol address, an Ethernet address), location data, and/or the like, or any combination thereof. The comparison made by Gatekeeper 125 between the received digital identification data and the previously stored customer authentication data may involve multiple factors. For example, the authentication may be a multi-factor authentication using both a MAC address and a fingerprint; or using both a fingerprint and a location. In some embodiments, authentication is based on the presence of a certificate on Access Device 110A and/or presence of a private encryption key on Access Device 110A that is capable of encrypting part of a response. For example, data may be sent to Access Device 110A and encrypted there using a private encryption key. The encrypted data is then returned to GateKeeper 125 where it is decrypted using an (optionally public) decryption key. Successful decryption confirms presence of the private encryption key on Access Device 110A and, thus, achieves authentication.

In some embodiments, the role of GateKeeper 125 in authentication of members of Access Devices 110 is limited to ratification of digital identification data and reporting this ratification to authentication logic (discussed elsewhere herein). However, in other embodiments, GateKeeper 125 is configured to have more direct control over access to secure customer data.

GateKeeper 125 may use a variety of approaches for controlling access to secure customer data. In some embodiments, GateKeeper 125 is configured to communicate specific data access keys to CRM Systems 120 in response to successful ratification requests. In these embodiments, the data access keys are used to access and/or decrypt customer data on the CRM Systems 120. The data access keys are optionally configured to be temporary such that they provide access during just one communication session. In some embodiments, Gatekeeper 125 is configured to function as a bridge between part of CRM System 120A and secure customer data. In these embodiments, GateKeeper 125 may be configured to directly block or allow requests to access the secure customer data from CRM System 120A. For example, Gatekeeper 125 may be configured to allow different types of queries on a database (of customer data) as a function of the level of authentication that has been achieved. Queries may be parsed or filtered to determine if they should be allowed. For example, a query to customer data for a customer using Access Device 110A may be allowed after Access Device 110A is successfully authenticated, while a query (optionally from the same source) to customer data for a different customer may be denied. The database and database management logic are optionally included on Gatekeeper 125, or on CRM System 120A.

In another approach, Gatekeeper 125 controls access to secure customer data using Network Access Control (NAC). NAC uses the configuration of access points, such as firewalls, switches or routers to control access to resources within a protected network. Typically, access to resources including secured customer data is only granted (from CRM Systems 120) after authentication of a member of Access Devices 110 or of a customer. The granted access may be temporary and may be granted only to a particular customer service agent interface, e.g., access may be granted or denied on the granularity of a particular device hosting a customer service agent interface. This (NAC) approach provides a level of security on a network level, in which access to particular resources on a protected network is controlled. This approach is optionally used in conjunction with other access control methods disclosed herein. For example, NAC may be used to control access to a particular resource including secure customer data and query filtering used to control access to particular data records within a database.

In some embodiments, Gatekeeper 125 is configured to facilitate both automatic and manual authentication. For example, Gatekeeper 125 may first automatically authenticate Access Device 110A and then provide questions to manually authenticate a customer using Access Device 110A.

Following authentication of a member of Access Devices 110 and/or a particular customer, access rights are granted. These access rights can include, for example, the right to access secure customer data associated with a particular customer, the customer being previously associated with the member of Access Devices 110. The access rights can include permission to discuss the secure customer data with the customer. In some embodiments, the granted access rights are transferrable. For example, if a telephone call or chat session is transferred from one customer service agent to another customer service agent, some or all of the granted rights may also be transferred. In some embodiments, manual authentication of a customer occurs once per communication session and memory of that authentication is transferred between customer service agents, while automatic authentication of the member of Access Devices 110 used by the customer is repeated for every customer service agent involved in the communication session. Both manual and automatic authentication is optionally applied to a communication session in a layered approach. The manual and automatic authentication may be applied in parallel or serially.

Some embodiments of Customer Communication System 100 further include an Advertising Server 130. Advertising Server 130 is optionally part of CRM System 120A and includes memory configured to store advertisements and logic configured to select advertisements for delivery to members of Access Devices 110. For example, Advertising Server 130 may include a database of advertisements and a microprocessor configured using computing instructions to select advertisements from the database. The selection of advertisements is optionally based on information that is only available after a source of a customer service request has been authenticated. For example, an advertisement may be selected based on an account balance, credit card, debit card or checking transaction history, history of service requests, and/or the like.

FIG. 2 illustrates further details of Access Device 110A, according to various embodiments of the invention. Access Device 110A can include a wide variety of devices such a personal computer, smartphone, tablet device, wearable device, a kiosk, or the like. In some embodiments, components disclosed as being included in Access Device 110A are provided as part of an SDK (Software Development Kit) for third party implementation. For example, a business may use the SDK to add the disclosed components to their propriety mobile application. Access Device 110A includes an I/O 210 configured for communicating with external devices via Network 115. I/O 210 may comprise an antenna and circuit configured to communicate via Bluetooth, WiFi, GSM, CDMA, or other wireless communication standard. I/O 210 may comprise a wired communication port such as a USB, FireWire, or Ethernet port, and/or the like. One example of I/O 210 includes the wireless antenna and communication circuits in a mobile phone. I/O 210 is optionally configured for communication over multiple communication channels. For example, I/O 210 may be configured for communicating over a public telephone switching network (PTSN), over the internet according to TCP/IP protocols, via short messages services (SMS) or multi-media services (MMS), via wireless protocols (e.g., Wifi or Bluetooth), via a cellular network, and/or the like. I/O 210 may be configured to communicate data messages based on Internet Protocol (IP) addresses and/or to communicate analog or digital data to telephone numbers. I/O 210 is configured to receive first sound data from a first remote client, and to receive second sound data from a second remote client, where the first sound data is associated with first time data, and the second sound data is associated with second time data, which may later be synchronized with the first time data.

Access Device 110A further includes a Display 215 configured to display a user interface to a user of Access Device 110A. Display 215 includes a touch screen, projector, computer screen, phone screen, and/or the like. Display 215 may be built into or attached to Access Device 110A as an accessory. Examples of Display 215 include a computer monitor attached to a personal computer, a built in monitor of a laptop or tablet computer, a mobile phone screen and a head-mounted display of a pair of smart glasses. Display 215 is optionally connected to other parts of Access Device 110A by a wireless connection.

Access Device 110A optionally includes an Access Control 220. Access Control 220 includes logic configured to restrict access to functions of Access Device 110A. Access Control 220 can include, for example, the logic that requires a personal identification number (PIN) be entered on a mobile phone or the logic that requires that a password be provided to log into an account on a personal computer. Implementations and structures of such logic are well known in the art. When present, Access Control 220 provides a first step in an authentication process by requiring that a user provide their password or PIN, etc. This step provides assurance that the user of Access Device 110A is authorized to at least access functions on Access Device 110A.

Access Device 110A optionally includes one or more unique device identifiers. These identifiers can be used to positively identify Access Device 110A. In some embodiments, the unique identifiers are stored in an IMEI Storage 225. IMEI Storage 225 includes a memory location configured to store an International Mobile Equipment Identity number or Mobile Equipment ID, or a mobile phone number. In some embodiments, the unique identifiers are stored in an Address Storage 230. Address Storage 230 includes memory configured to store a MAC address, an internet protocol address, an Ethernet address, a network address, and/or the like. Address Storage 230 is optionally further configured to store a temporary session identifier for use in a particular communication session. This session identifier may be used to re-authenticate Access Device 110A during the particular communication session. For example, a session identifier is optionally configured for use in automatically reauthorizing a session as a telephone call or text session is passed from a first service agent to a second service agent.

Access Device 110A further includes an Authentication Agent 235. Authentication Agent 235 is configured to facilitate client-side processes in support of manual and/or automatic authentication of Access Device 110A. For example, in some embodiments, Authentication Agent 235 is configured to receive an authentication request from a CRM System 120A and to automatically provide digital identification data in response to this request. The digital identification data may be provided to CRM System 120A and/or GateKeeper 125. The digital identification data may include one of the unique identifiers stored in Address Storage 230 and/or IMEI Storage. For example, the digital identifier may include a MAC address or an IMEI number. Authentication Agent 235 is optionally configured to post a message on Display 215 requesting that a user provide a password, PIN, fingerprint, image, and/or the like.

In various embodiments, the digital identification data includes information provided by a user of Access Device 110A. For example, the provided information may include a fingerprint of the user obtained using a Fingerprint Reader 240. Fingerprint Reader 240 is configured to scan a user's finger print and generate digital data representing the fingerprint in real-time. Fingerprint Reader 240 is optionally also part of Access Control 220. Examples of Fingerprint Reader 240 are found in mobile phones and personal computers, where they are used for login. In another example, the digital identification data includes information provided by a user using a Camera 245. This information can include a photograph of the user or a video of the user. In some embodiments, this information is assured to be in real-time. For example, the video of the user can be assured to be a current video by requiring that the user respond in real-time to requests or instructions from Access Device 110A. The user may be requested to make certain motions or say certain words.

In various embodiments, the digital identification data provided by Authentication Agent 235 includes information generated using a global positioning system (GPS) 250. GPS 250 includes a GPS receiver and a circuit configured to determine a location based on the timing of signals received at the receiver. Such GPS structures are well known to be included in, for example, mobile phones.

In various embodiments, the digital identification data provided by Authentication Agent 235 includes information received from a Digital Key Device 255. Digital Key Device 255 is a physical device configured to store or generate a digital key. The digital key is optionally generated as a function of time based on an initial seed value. Digital Key Device 255 is optionally a dongle configured to be physically and removably attached to Access Device 110A. Alternatively, Digital Key Device 255 optionally includes a Bluetooth device configured to connect wirelessly to Access Device 110A via a secure Bluetooth connection. In an illustrative example, Digital Key Device 255 is a Bluetooth enabled device including a circuit configured to generate a time dependent key. When an authentication request is received from CRM System 120A, Authentication Agent 235 may be configured to automatically look for Digital Key Device 255 connected to a Bluetooth port of Access Device 110A. If Digital Key Device 255 is found, then an (optionally time dependent) key is retrieved from the found Digital Key Device 255 by Authentication Agent 235 and automatically provided in response to the authentication request. If then proper Digital Key Device 255 is not found, then a default (generic) key may be provided. This default key typically will not be sufficient to achieve device authentication.

In some embodiments, part of GateKeeper 125 is included in Access Control 220. For example, in response to an authentication request, Authentication Agent 235 may be configured to send a request for a password, PIN or fingerprint scan to an API of Access Control 220. Access Control 220 receives this request, displays the request on Display 215 and receives a password, fingerprint scan or PIN from the user. The received fingerprint scan or PIN is then ratified by comparison with a fingerprint data or a PIN previously stored on Access Device 110A. Access Control 220. The logic used for this ratification may be considered a local part of GateKeeper 125 and is optionally the same logic used to log into Access Device 110A. If the ratification is successful, then Authentication Agent 235 communicates this success to CRM System 120A in the form of a ratification token such as a confirmation variable or time dependent key. This is an example of ratification occurring on Access Device 110A, rather than elsewhere on Customer Communication System 100.

In some embodiments, Authentication Agent 235 includes logic configured to generate a rolling code and/or a time dependent key, based on a seed value. Such logic is available in a variety of access control systems, and is known to one of ordinary skill in the art.

An authentication request received from CRM System 120A typically includes an identifier of CRM System 120A and/or of GateKeeper 125. This identifier may be used as an address for responding to the request, or may be used to determine a type of authentication desired. For example, an authentication request received from CRM System 120A may include a network address of CRM System 120A and/or a network address of GateKeeper 125. In one embodiment, Authentication Agent 235 receives this information and based on the network address of CRM System 120A determines that authentication requires fingerprint data. Authentication Agent 235 obtains the required fingerprint data using Fingerprint Reader 240 and then uses the network address of GateKeeper 125 to automatically send the required fingerprint data to GateKeeper 125. As discussed elsewhere herein, GateKeeper 125 is configured to compare the fingerprint data with data previously stored in association with a particular account and to grant authorization for a customer service agent at CRM System 120A to access secure customer data, if the fingerprint data matches the previously stored data.

Access Device 110A optionally further includes Transaction Memory 260. Transaction Memory 260 includes physical digital memory and a data structure configured to store a record of transactions made between Access Device 110A and members of CRM Systems 120. This record can include details of customer support sessions, products or services acquired during the support sessions, recommendations made by service agents, sales of products or services, and/or the like.

In some embodiments, the transactions stored in Transaction Memory 260 are used, by Advertising Server 130, to select advertisements to be presented on Display 215. This selection may also be based on a time, a location of Access Device 110A, and/or a user's account information (age, gender, zip code, income, etc.). The selection of an advertisement is optionally performed on a device external to Access Device 110A. For example, the transactions and a current location may be sent to Advertising Server 130 via Network 115. An advertisement selected based on this information is then provided to Access Device 110A for display on Display 215. Authentication Agent 235 is optionally configured to display the advertisement when a service request is made. The advertisement may also be selected based on whom the service request is made to (e.g., CRM System 120A or CRM System 120B).

In an optional Call Back Step 413, a "callback" is received at Access Device 110A from CRM System 120A. Call Back Step 413 is not needed, for example, when a customer service agent is immediately available at CRM System 120A. The callback may occur at a scheduled time or when the next customer service agent is available.

Access Device 110A optionally further includes Scheduling Logic 265. Scheduling Logic 265 is configured to facilitate scheduling a callback from CRM System 120A to Access Device 110A. Such a callback may be desirable when a customer service agent is not immediately available. In some embodiments, Scheduling Logic 265 is configured to show an estimated wait time before a customer service agent is expected to be available and to provide the customer with an option of scheduling an appointment at a later time.

Scheduling Logic 265 is configured to communicate with CRM System 120A and to receive information regarding expected availability times for customer service agents. These times may be expressed as absolute times (e.g., 3:35 PM EST) or relative times (e.g. in 20 min). Several alternative times may be provided and presented to a user as a list on Display 215 or audibly. In some embodiments, Scheduling Logic 265 is configured to automatically receive a user's calendar data, such as Apple Calendar, Microsoft Outlook or Google Calendar data. Scheduling Logic 265 then uses the calendar data to identify callback times at which the user is free (i.e., not scheduled for something else). In alternative embodiments, the calendar data is communicated to CRM System 120A and the comparison made there. Scheduling Logic 265 is optionally configured to add the callback to the user's calendar as a scheduled event.

The availability of customer service agents for callback is optionally dependent on subject matter of the customer service request. For example, a request for technical assistance may be scheduled only with customer service agents qualified to support such requests. The availability of customer service agents for callback may also be dependent on scheduled work breaks (of the agents), other scheduled callbacks, the number of agents expected to be available at that time, availability of agents who previously engaged with the user, language, and/or the like. For example, a user may request a callback from the agent who previously helped them, or may request an agent that speaks Spanish.

Access Device 110A optionally further includes Application Logic 270. Application Logic 270 includes applications optionally configured to control hardware (e.g., input hardware) on Access Device 110A. Specifically, Application Logic 270 may be configured to control Camera 245, Fingerprint Reader 240, Display 215, a radio, and or the like. Application Logic 270 optionally includes third party software provided by a maker of the access device or received from an independent source. Application Logic 270 is optionally configured to manage communications between Access Device 110A and other local and/or remote devices. Application Logic 270 can include one or more separate logic modules and/or separate applications. Application Logic 270 may be configured to automatically accept and implement at least certain commands from CRM system 120A and/or may include a logic for interacting with a third party payment and authentication system.

For example, Application Logic 270 is optionally configured to activate Fingerprint Reader 240, to receive biometric data from Fingerprint Reader 240, and to communicate the biometric data to CRM System 120A. Alternatively, Application Logic 270 may be configured to receive biometric data from Fingerprint Reader 240 and process this data to verify identity of the user and report this verification to CRM System 120A. In another example, Application Logic 270 may be configured to activate Camera 245 for the purposes of taking a photograph or video. Application Logic 270 may process the photograph and/or send the photograph to CRM System 120A. For example, in various embodiments Application Logic 270 is configured to identify an object in a photograph, perform optical character recognition on a photograph, and/or read a barcode within a photograph. The results of these processes may be sent to CRM System 120A.

In some embodiments Application Logic 270 is configured to receive a request for information from CRM System 120A and to display/present a menu on Display 215 in response to this request. The menu may be customized by Application Logic 270 or prior to being received by Application Logic 270. The customization is according to a "menu customization," which is an entire customized menu or a set of changes to a default or prior menu. The menu is displayed to the user and a selection among elements of the menu is received from the user of Access Device 110A. For example, a customer may select an element from the menu using a touch screen of Display 215. The menu is optionally hierarchical and the customization of the menu can include variations to the contents of specific menu items, the hierarchical structure of the menu, and/or the presence of specific menu items. Customized menus may be visual and/or audio.

A menu customization can include more than just a list of menu items. For example, a menu customization can selectable menu objects including button, links, active icons, etc., which control operation of Application Logic 270. Both the presence of objects and their functionality can be customized. For example, a customer service agent may directly select, from a plurality of alternatives, the functionality that would be activated by selecting (e.g., clicking on) particular menu items. In an illustrative example, a customer service agent may select in real time how a menu item "make a new reservation" controls the operation of Application Logic 270 based on an ongoing conversation/text between the user and the customer service agent. In one alternative, the user is directed to a standard reservation system and in another alternative the user is directed to a VIP reservation system and/or gets a reservation that has been discussed with the customer service agent.

In various embodiments, the menu customization can be based on a wide variety of criteria. For example, in some embodiments, menu customization is dependent on characteristics of a user (e.g., customer) using Access Device 110A. These can include the location of the customer, the identity of the customer, purchase history of the customer, prior service history of the customer, authentication of the customer, gender of the customer, and/or the like. The menu customization can be based on any of the criteria taught to be used for pipeline selection elsewhere herein. For example, a customer may receive a menu customized to a location of the customer where the location is that of a shopping mall, an airport, a train station, a bus station, a hotel, a convention center, a city, a street, and/or the like. The customer may receive a menu customized based on their wealth, on an account value, on the last customer service agent they interacted with, on their previous menu selections, and/or the like. A customer may receive a different menu customization after authentication of the customer and/or Access Device 110A, relative to before authentication. Specifically, an authenticated customer may receive a menu having added options relative to a non-authenticated customer. In some embodiments, a menu customization is responsive to input from a customer service agent. For example, a customer service agent may be able to specify all or part of a menu customization in real-time during a communication session between the customer service agent and a user of Access Device 110A.

In some embodiments, menu customizations are configured for A/B testing. A/B testing is a process in which at least two variants (A and B) are compared based on one or more performance criteria. A/B testing is used in an iterative process to optimize performance according to the criteria. Typically, A/B testing is applied to webpages. However, embodiments of the invention include A/B testing for menus. The testing may include menu structure and/or menu content. Specifically, menu customizations can include multiple variants of a menu provided to different users, the performance of which is then measured. Menu customizations may be changed in an iterative process for progressive improvement of the menu. The criteria by which performance is measured can include, for example, the accuracy of menu selections, how long the user spends traversing the menu, time taken by a customer service agent following the menu selections, how often a customer service agent has to redirect a customer service request, and/or the like. The menu customization can be responsive to any known A/B testing algorithm, and may be audio and/or visual.

In some embodiments, menu customizations are related to a specific customer service agent. For example, if a customer has previously worked with a particular customer agent, a menu may be adapted to allow the customer to request that specific agent, or adapted based on input by that agent. For example, the agent may provide input indicating that the customer should get express and/or specific help, that the customer needs specific types of services, types of problems being experienced by the customer, events impacting the customer, outcome of a previous customer service request, mood of the customer, hardware used by the customer, and/or the like. In a specific example, a customer service agent may indicate that a customer was dissatisfied with a product or service and a menu customization may include an option to be connected directly with a supervisor or to obtain a return authorization number. In another example, a customer service agent may learn that a customer missed a flight and a menu customization generated in response to this indication may include menu options related to rescheduling the flight.

The customer service agent may cause Application Logic 270 to display a menu of alternative flights for rebooking on Display 215, rather than having to orally discuss each option with the customer. Such real-time display of the menu can occur during the conversation between the customer service agent and the customer, under the control of the customer service agent. The menu customization is populated with the alternative flights automatically and/or under manual control of the customer service agent. For example, the customer may specify (e.g., verbally) that they are satisfied with staying at a hotel for the night and flying in the morning. The customer service agent can then select hotel options and flight options from a list for inclusion in a menu customization to be delivered to Access Device 110A.

In some embodiments menu customizations are related to an order history of a customer. For example, a menu customization may relate to a specific item recently shipped or a service recently provided. Such customization may be automatic and/or performed in real-time.

Menu customization can be responsive to the status of a customer service pipeline, real-time availabilities of customer service agents, the status of a particular customer service agent, and/or an estimate of an amount of time before a user may be connected to a customer service agent. For example, if customer service agents having a specific expertise are available, then a menu may be customized to include an option for service related to the specific expertise. In a more specific example, if a customer service agent able to speak Russian is available, then a menu may be customized to include an option for communication in Russian. Likewise, when the expected wait time for one or more customer service pipelines is longer (relative to other times) the menu may be customized to provide more options for the customer to help themselves and/or schedule a callback. This and other menu customization can be performed in real-time, e.g., in response to a current state of a customer service pipeline or other criteria.

Menu customization is optionally responsive to a particular event. For example, the CRM System 120A may receive real-time event information and/or an identifier of a real-time event, and in response generate a menu customization based on that information. In an illustrative example, if an airline flight is cancelled, CRM System 120A may receive a notice of this event from an aircraft scheduling system. Alternatively, a customer may be notified that their flight has been cancelled or delayed, the notice including an identifier of this event. The customer can then make a request for service to CRM System 120A, the request including the identifier.

A menu customization is generated in response to the event. The menu customization including changes in menu structure and/or contents in response to the event. For example, where the event is a flight cancellation the menu customization may add a menu option for scheduling a different flight or making a hotel reservation. Similar approaches to real-time menu customization may be made in response to events such as a change in stock price, a change in a travel schedule, a weather event, a traffic event, a change in vehicle status (e.g., crash, location, delay, occupancy, etc.), a change in temperature, an alarm trigger, a loss of communication signal, a financial transaction, availability of test (e.g., medical) results, completion of a service (e.g., car repair), a financial discount, a business offering (e.g., flash sale), and/or the like.

Application Logic 270 is optionally configured to receive a notice of an event, such as any of the events discussed herein. The notice may be received from Advertising System 130, CRM System 120A, from another one of Access Devices 110, or from a third party. The event notice can include a simple identifier, e.g., "event 6 has occurred," or alternatively can include data and/or metadata concerning an event. For example, an even notice can include the cancellation of a flight and flight details, the availability of a business offering and product and pricing details, and/or the like. The event may be real-time, e.g., the event notice may be received as the event is occurring or during a time interval immediately following an event.

Application Logic 270 is optionally configured to present the event to a user using Display 215 and/or to automatically generate a service request in response to the event. For example, Application Logic 270 may receive an event related to delayed delivery of an ordered product, display information regarding the event to a user via Display 215 and generate a menu customization including options for responding to this event. The options for responding to the event optionally include making a customer service request to CRM System 120A. The type of request (e.g., callback, voice call, text or e-mail) and menu customization may be dependent on the availability of customer service agents and the number of Access Devices 110 to which the notice has been sent.

In a specific example, a medical test result may become available, a notice of this result sent to Access Device 110B where information regarding the result is presented to a user. The information is accompanied by a customized menu that provides the user with options for making a doctor appointment or scheduling a call with the doctor. These options may be responsive to the doctor's schedule.

In another specific example, a flight is cancelled or overbooked, notice of the cancellation or overbooking is sent (in real-time) from a flight scheduling system to both CRM System 120A and a plurality of Access Devices 110. At CRM System 120A the event notice is used to increase the number of available customer service agents and/or to advise a set of customer service agents of details of the cancellation. At each of Access Devices 110 the event notice is used to inform users that the flight has been cancelled and to provide a menu of options, such as alternative flights, hotels and customer service. The menu of options is customized in real-time and the customization may be responsive to location of user, identity of flight cancelled, VIP status of user, availability of alternatives flight arrangements, a callback schedule, price paid for the cancelled flight, prior purchase of flight insurance, customer service agent availability, and/or any of the other criteria discussed herein. In some embodiments, users are provided with a menu customization that includes a call-back option or other option dependent on a schedule. For example, menu options can be dependent on a customer service agent availability schedule or a flight schedule. Times for call-back presented in the menu can be selected to fit the schedule so as to efficiently distribute service calls over a set of customer service agents. Priority for call-backs can be determined based on any of the wide range of factors discussed herein. For example, a menu customization and/or call-back schedule may be configured such that a customer that paid more for a ticket or purchased flight insurance gets first chance at rescheduling on alternative flights.

Application Logic 270 is optionally further configured to manage enhancement of a communication channel. For example, Application Logic 270 is optionally configured to receive activation data from CRM System 120A or some other remote device. The activation data includes one or more commands to cause Application Logic 270 to open a second (new) communication channel. The second communication channel may be between Access Device 110A and CRM System 120A, or in some embodiments, between a device locally connected to Access Device 110A and CRM System 120A. As used herein, the term "locally connected" is used to refer to devices that are connected on a local network, such as devices connected by a home router. Examples of locally connected devices include a television, cellular phone and climate control system in communication with each other via a Wifi or Bluetooth enabled modem.

Typically, the activation data is sent to Access Device 110A (or a device connected thereto) using an identifier of Access Device 110A or the connected device. Examples of such identifiers are discussed elsewhere herein. However, in one example, a caller ID of Access Device 110A is received at CRM System 120A as a result of a telephone call from Access Device 110A to CRM System 120A. This caller ID is then used to communicate the activation data from CRM System 120A to Access Device 110A. In some embodiments, the telephone call is made using a first communication channel (e.g., a voice channel of the cellular telephone network) and the caller ID is used to communicate back to Access Device 110A via a different channel (e.g., an SMS or MMS channel). The activation data may include a link, command string, communication parameters, the identifier of Access Device 110A, an identifier of a locally connected device, an identifier of CRM System 120A, and/or a session ID. In some embodiments, a user of Access Device 110A is required to select, e.g., click on, a representation of the activation data in order to permit the activation data to control Application Logic 270.

Application Logic 270 may be configured to send the identifier of Access Device 110A (that was used to receive the activation data) or some other identifier (e.g., a session ID) of the communication session established in the first communication channel to CRM System 120A. Further, as described elsewhere herein, Access Device 110A can have stored therein a variety of additional device and/or user account identifiers. These device and/or user account identifiers are optionally also communicated to CRM System 120A. For example, Application Logic 270 may send an IMEI number, a user account identifier (name, e-mail, etc.) using the second communication channel opened in response to the activation data. As discussed further elsewhere herein, these data may be used to associate a user's telephone number with an account that was previously indexed using just a user name or e-mail address. In some embodiments, the information communicated to CRM System 120A via the second communication channel includes an identifier or address of a device locally connected to Access Device 110A. For example, the address of a television set or modem connected to Access Device 110A (by wire or wirelessly) may be sent to CRM System 120A.

The activation data is optionally received via a third communication channel, separate from the first communication channel and the second (new) communication channel opened in response to the activation data. (The "first," "second" and "third" are not chronologic designations.) For example, the first communication channel may be a voice channel, the second communication channel may be a secure internet session (using SSL) and the third communication channel may be an SMS or MMS data channel. The second communication channel may have an enhanced communication functionality relative to the first communication channel. "Enhanced communication functionality," as used herein, is meant to mean a larger and/or more useful set of communication functions. For example, enhanced communication functionality can include an ability to send data using packets via TCP/IP protocols, to send data to internet protocol addresses, to communicate video, to communicate digital commands to Application Logic 270, to communicate over a secure connection, to communicate over an authenticated connection, and/or the like. If the first communication channel is capable of communicating the activation data, e.g., the first contact to CRM System 120A from Access Device 110A is via text message, then a third communication channel may not be needed. In one example, the first communication channel is not configured for performing the various secure communications required (as discussed elsewhere herein) for authentication of Access Device 110A, and the second communication channel is configured for performing these communications. In another example, the first communication channel is not configured to communicate digital commands between Access Device 110A and CRM System 120A, and the second communication channel is configured to communicate digital commands between Access Device 110A and CRM System 120A. In another example, the first communication channel is not configured for controlling Application Logic 270 from CRM System 120A and the second communication channel is configured for controlling Application Logic 270 from CRM System 120A. In another example, the first communication channel is not configured for communicating between Application Logic 270 and an API of CRM System 120A, and the second communication channel is configured for communicating between Application Logic 270 and an API of CRM System 120A.

Access Device 110A optionally further includes Identification Logic 275 configured to send an identifier of Access Device 110A to a remote server (e.g., CRM System 120A) via the first communication channel. The identifier of Access Device 110A can be a SMS address, an MMS address, a caller ID number, an IP address, a MAC address, and/or the like. In one example, Identification Logic 275 is configured to read an account identifier and/or an identifier of Access Device 110A from memory within Access Device 110A. Identification Logic 275 is optional in embodiments where this functionality is part of Network 115. For example, a caller ID number may be generated by a PTSN or a cellular network switch rather than by a mobile device connected to these networks.

Access Device 110A further includes a Processor 290. Processor 290 is a digital microprocessor configured to execute computer instructions within Access Device 110A. For example, Processor 290 is typically configured to execute at least part of Authentication Agent 235, Scheduling Logic 265, and/or Application Logic 270.

Authentication Agent 235 includes hardware, firmware and/or software stored on a non-transient computer readable medium. For example, in some embodiments, Authentication Agent 235 includes a software application downloaded and installed on Access Device 110A. More specifically, Authentication Agent 235 may include an application downloaded onto a smart phone or other mobile device. Authentication Agent 235 is optionally configured to encrypt the digital identification data such that the digital identification data is communicated to CRM System 120A and/or Gate-Keeper 125 in an encrypted form.

Third Party System 140 is a third party system for authentication and/or making payments. Third Party System 140 may authenticate sensitive customer data, such as credit card number, bank account numbers, whether the customer has adequate funds for a purchase, private unique customer identifiers, such as social security numbers, tax identification numbers, information about the customer's current and previous loans, dwellings, employment, purchases, major purchases, and/or private credit history information, for example. Third Party System 140 provides an option for authenticating the customer by checking sensitive information and/or making payments without giving access to the customer service agent to the sensitive information. Although GateKeeper 125 performs ratification, in an embodiment in which GateKeeper 125 is a separate entity from CRM 120A. Optionally Third Party System 140 includes GateKeeper 125 or GateKeeper 125 may include Third Party System 140.

FIG. 3 illustrates further details of Customer Relationship Management (CRM) System 120A, according to various embodiments of the invention. CRM System 120A may be part of an enterprise computer system configured for management of call centers. This enterprise system are optionally cloud based (e.g., Software as a Service—SaaS) and can include features such as call routing, call queuing, service agent interfaces and access to client data. CRM System 120A comprises one or more computing devices and is optionally distributed among multiple locations. As discussed elsewhere herein, GateKeeper 125 is optionally disposed within CRM System 120A, and this instance of GateKeeper 125 may be configured to additionally support CRM System 120B. In alternative architectures, each of CRM Systems 120 may include their own instance of GateKeeper 125, or a GateKeeper 125 (external to any of CRM Systems 120) may be configured to support multiple CRM Systems 120.

CRM System 120A further includes a Client Data Storage 310 configured to store client data. This client data can include secure customer data and/or less-secure customer data. The secure customer data is typically stored in relation to particular accounts and can include information such as account numbers, balances, transaction authorization keys, customer history, orders, medical information, social security numbers, etc. Client Data Storage 310 includes a physical computer readable storage media such as a hard drive or optical drive. Client Data Storage 310 may also include a relational database and a database management system. The database management system is optionally configured to require keys confirming authentication before some secure customer data can be retrieved. In some embodiments, Client Data Storage 310 is remote relative to one or more other parts of CRM System 120A and/or is accessible via Network 115 or a private communication network.

CRM System 120A further includes Authentication Logic 320 configured to authenticate a source of a customer service request, e.g., to authenticate Access Device 110A. Authentication Logic 320 is configured for this task by including logic to, for example, receive a customer service request from Access Device 110A, determine that the customer service request may require access to secure customer data, send a authentication request for digital identification data to Access Device 110A, receive the requested digital identification data and forward the digital identification data to GateKeeper 125. As discussed elsewhere herein, GateKeeper 125 is configured to ratify the digital identification data by comparing the received digital identification data and previously stored customer authentication data, and based on this comparison approve or disallow the authentication of Access Device 110A. The authentication is typically associated with a particular account and secure customer data within that account. In some embodiments, Access Device 110A must have previously been registered as an authorized access device for the particular account. If the authentication is approved, the approval is communicated to Authentication Logic 320.

The authentication may be communicated to Authentication Logic 320 by setting of a flag, providing an access key, providing query access to Client Data Storage 310, returning a variable indicating success, and/or the like. In some embodiments, once Access Device 110A is authenticated for a particular communication session it is assigned a session identifier (ID). The session ID includes a value that may be used to automatically re-authenticate Access Device 110A if the connection between Access Device 110A and a first service agent on CRM System 120A is transferred to a second (or additional) service agent on CRM System 120A. The session ID is optionally provided to Authentication Agent 235 for this purpose. Typically, once the communication session is concluded privileges of the session ID are cancelled such that it cannot be reused to authenticate any of Access Devices 110.

In some embodiments, Authentication Logic 320 is configured to authenticate one of Access Devices 110 using at least two methods. A first of these methods optionally being a "manual" method involving a service agent. For example, in the manual method Authentication Logic 320 may provide the service agent a series of questions to be asked by the service agent and to be answered by a user of Access Device 110A. The answers provided by the user are then compared to answers to the questions previously provided by the user or to data the user should have knowledge of. This comparison can be made by the service agent or by Authentication Logic 320. A second of these methods is, as discussed elsewhere herein, by providing digital identification data received from the one of Access Devices 110 to GateKeeper 125 and automatically receiving a ratification of the digital identification data from GateKeeper 125. The two methods of authenticating one of Access Devices 110 can be applied in parallel or serially.

CRM System 120A further includes one or more Agent Interface 330. Agent Interface 330 includes logic configured to generate and operate a graphical user interface having fields for presenting data to a customer service agent, and for the customer service agent to enter commands. The graphical user interface is optionally based on HTML or similar language. In some embodiments, Agent Interface 330 is configured to visually mark data secure customer data that is not authorized for communication to a user of Access Device 110A. Once Access Device 110A is authenticated for a particular communication session, the visual markings on the secure customer data may be removed as an indication to the customer service agent that the data can be discussed with the user of Access Device 110A. Note that, while the examples presented herein discuss granting or not granting a customer service agent access to secure customer data. In alternative embodiments, the customer service agent may have access to this data by default and what is granted or not granted is permission for the customer service agent to communicate this data to a member of Access Devices 110. The examples provided are intended to apply to both granting of access and granting of permission.

In alternative embodiments, Agent Interface 330 is replaced by, or additionally includes, an API (Application Program Interface) to computer instructions configured to automatically provide functionality of a human agent or some other functionality. For example, Agent Interface 330 may be replaced by an API to an expert system or other application. In some embodiments, the API is server based or peer based logic configured to perform tasks in cooperation with an application executing on Access Device 110A.

Agent interface 330 provides an interface between the customer service agent and CRM System 120A, between Agent Application 390 and the rest of CRM System 330, and between Agent Application 390 and other remote devices. Agent Interface 330 may include a graphical user interface and logic for setting up the protocols and/or the protocols for communicating with other applications, which may be local or remote to CRM system 120A. Agent Interface 330 may be configured to communicate in a secure communication channel between the agent application and the client application, send a command to the client application via the I/O to contact the Third Party System 140.

CRM System 120A optionally further includes Access Logic 340. Access Logic 340 is configured to provide members of Access Devices 110 to secure customer data after the members have be authenticated as discussed herein. For example, in some embodiments, Access Logic 340 may be configured to share a view of secure customer data on both Agent Interface 330 and Access Device 110A. While screen or data sharing technology is well known, Access Logic 340 is distinguished by being responsive to whether Access Device 110A has been authenticated for a particular communication session. For example, Access Logic 340 may include computing instructions configured to block access (from Access Device 110A) to secure customer data or to a view of this data until Access Device 110A has been authenticated.

CRM System 120A optionally further includes Forwarding Logic 350. Forwarding Logic 350 is configured to transfer a communication session from a first customer service agent to a second customer service agent. For example, a user of Access Device 110A may be communicating with the first customer service agent and the first customer service agent wishes to transfer the user to the second customer service agent (or add the second customer service agent for a 3-way communication session). Once the second customer service agent is in communication with Access Device 110A, Access Device 110A can be automatically re-authenticated using Authentication Logic 320 and GateKeeper 125. This re-authentication is optionally based on a session ID. In some embodiments, Forwarding Logic 350 is configured to communicate the session ID to the second customer service agent, where it can be used for authentication be comparing with a copy of the session ID stored on Access Device 110A.

CRM System 120A optionally further includes Pipeline Logic 360. Pipeline Logic 360 is configured to manage queues (pipes) of customer service requests and the availability of customer service agents. Queues of customer service requests may be general or presorted. Presorted Queues include customer service requests that satisfy criteria of the presorted queue. For example, a presorted queue may include request related to specific subject matter, requiring a Spanish speaking customer service agent, or requests assigned to a specific customer service agent. Customer service request may be placed in a specific presorted queue based on multiple criteria. One or more customer service agents may be assigned to a specific queue.

Pipeline Logic 360 is optionally configured to calculate estimates of customer service agent availability. These estimates may include when any agent or a specific agent will next be available, estimates of how long waits are in a queue, how many agents will be available at a specific time, when an agent assigned to a specific queue will available, times for which calls can be scheduled, and/or the like. For example, Pipeline Logic 360 may be configured to provide to Scheduling Logic 265 an estimated wait time before a customer service agent is expected to be available in response to a customer service request and/or to provide information regarding expected availability times for customer service agents. This information may be used to schedule callbacks. The scheduling may be performed by Scheduling Logic 265 on Access Device 110A or by Pipeline Logic 360 on CRM System 120A. Further details of Pipeline Logic 360 are discussed elsewhere herein.

CRM System 120A optionally further includes Request Logic 365 configured to send requests from CRM System 120A to Access Devices 110 and to receive responses therefrom. The requests may be sent in response to entries made by a customer service agent via Agent Interface 330, automatically generated by Authentication Logic 320, and/or automatically generated by Request Logic 365.

Requests generated by Request Logic 365 optionally include commands configured to control parts of Access Device 110A via Application Logic 270. For example, a request can be configured to turn on a camera function (e.g., of Camera 245), turn on a microphone, activate Fingerprint Reader 240, make a wireless connection (e.g., via a radio in I/O 210), and/or present content on Display 215. Because the generation of requests by Request Logic 365 is optionally under the control of a customer service agent via Agent Interface 330, the customer service agent may directly control these parts of Access Device 110A. For example, Agent Interface 330 may include an input (e.g., virtual button, form field, check box or keystroke) that allows a customer service agent to turn on the GPS, fingerprint reader, camera, screen capture function, and/or other part of on Access Device 110A. This provides control of input hardware and/or other hardware elements on Access Device 110A to the remote customer service agent via CRM System 120A. In some embodiments, this also assures that these components are used properly. For example, the customer service agent's control of a fingerprint reader, via a command sent to Application Logic 270, can provide assurance that a fingerprint provided was obtained from a user in real-time. Likewise, if Camera 245 is controlled by a command sent in a request from CRM System 120A then Application Logic 270 can be used to provide assurance that an image provided back to CRM System 120A in response is a real-time image of a user or other object.

Requests generated by Request Logic 365 optionally include menu customizations generated by Request Logic 365. In these instances, the requests typically include a request for a menu selection from a user of Access Device 110A. As discussed elsewhere herein, the menu customizations can be responsive to a wide variety of factors including previous responses to requests, availability of customer service agents, customer characteristics, external events, and/or the like. For example, Request Logic 365 may automatically generate a request that asks a user of Access Device 110A to select from among a menu of alternative authentication procedures. Request Logic 365 is optionally configured generate a series of menu customizations, each dependent on each other. For example, a response to a first customized menu may be used to generate a menu customization for a second customized menu. The second menu customization is optionally responsive to both an input from the customer service representative made after the first customized menu has been delivered to Access Device 110A and a response to the first customized menu received from Access Device 110A.

In an illustrative example, CRM System 120A and Access Device 110A are used to refill prescriptions. Application Logic 270 is used to send an initial customer service request to CRM System 120A. In response, CRM System automatically generates a request to Access Device 110A for authentication. As discussed elsewhere herein the authentication can include use of input hardware on Access Device 110 to answer authentication questions, evaluate a certificate on Access Device 110A, capture of an authentication image, obtain biometric data regarding a user of Access Device 110, and/or the like. In response to successful authentication, Request Logic 315 is used to generate a menu customization based on characteristics of the authenticated user. This menu customization can include, for example, a checklist of current prescriptions, medical tests, and/or doctor appointment information. The menu customization is presented on Display 215 as a new menu or a modification of a default menu. The user of Access Device 110A can then select from the menu to, for example, refill a particular prescription (for mail or pickup) and schedule a doctor appointment.

In another illustrative example, CRM System 120A and Access Device 110A are used to confirm and/or authorize a financial transaction. For example, if a user of Access Device 110A places an order on a website, the systems discussed herein can be used to present the user with details, terms and conditions of the financial transaction. Such an exchange can involve a customer service agent using Agent Interface 330. Further, the confirmation or authorization can be for a transaction verbally communicated between the user and customer service agent. The involvement of a customer service agent and the agent's ability to do so distinguishes the confirmation or authorization from those financial transactions entered purely through a web interface.

For example, in some embodiments, a user makes a customer service request through Application Logic 270 for a purchase or sale of company stock. This request is optionally in response to a notice regarding stock price changes. In response to this request, the user is first authenticated using systems and methods described elsewhere herein. The user and customer service agent are then connected in an audio and/or video communication channel. Images and/or voice of the user and customer service agent are communicated between Access Device 110A and CRM System 120A. The user can verbally (and/or via text) ask questions of the customer service agent and can also place orders for stock transactions. At any time in the exchange between these two parties, the customer service agent can send a confirmation request to Application Logic 270, which displays the request on Display 215 and waits for a response to the user. The confirmation request can include transaction details as entered by the customer service agent and can require a biometric response, e.g., a fingerprint scan or voice statement. The confirmation request is optionally initiated by the customer service agent using a control on Agent Interface 330. As noted elsewhere herein, the request can include a command configured to cause Application Logic 270 to activate input hardware on Access Device 110A.

In other embodiments, examples of confirmation/authentication requests initiated by a customer service agent, where timing of the request is controlled by the agent, include: requesting of pictures in an insurance claim, requesting accesses to a security camera in a home or business, providing terms and conditionings, asking for text input if audio/voice is unclear, asking permission to access tethered devices (e.g., over WiFi, Bluetooth, and/or cable), and/or the like. Examples of things that may be requested by a customer service agent via Agent Interface 330 include: a screen capture, location data, contents of Display 215, an image, fingerprint, approval of terms and conditions, or order details, biometric data, personal questions, electronic signature, voice statement, microphone activation, camera activation, radio information (e.g., WiFi address or MAC address), fingerprint scanner activation, device movement, and/or the like. In some embodiments, the requested information is provided to the customer service agent via Agent Interface 330. In some embodiments, the requested information is remotely processed. For example, answers to personal questions used to authenticate a user may be compared with previously stored answers by Application Logic 270, by a different agent, by a separate computing device, etc. This preserves privacy be preventing the answers from being directly observed by the customer service agent interacting with the user.

In some embodiments, a customer service agent may initiate a request via Agent Interface 330 that is not necessarily presented on Display 215 and/or requires input from a source other than the user of Access Device 110A. For example, a customer service agent may request data stored on Access Device 110A and/or from hardware in communication with Access Device 110A. Such hardware can include a cable box, a vehicle diagnostic system, a thermostat, a utility meter, a global positioning system, a personal computer, and/or the like. Such request may also be generated automatically by CRM System 120A.

CRM System 120A optionally further includes Notice Logic 370. Notice Logic 370 is configured to send notices of events to Access Devices 110, e.g., to Application Logic 270 on Access Device 110A. Notice Logic 370 is optionally included in CRM System 120B or in some other system. For example, Notice Logic 370 may be part of a third party scheduling system, appointment system, and/or calendaring system. Notice Logic 370 is optionally configured to receive data regarding an event from a source external to CRM System 120A. For example, Notice Logic 370 may receive schedule changes from a scheduling system, stock prices form a trading system, and/or data from environment sensors. Notice Logic 370 is optionally configured to process this information and generate notices accordingly. For example, a user may have configured an account on Notice Logic 370 to provide a notice in response to a stock price movement, a temperature reading at a thermostat, and/or location data.

Notices sent by Notice Logic 370 are optionally selectively sent based on customer characteristics or on characteristics of customer service agents. For example, in response to a notice of a flight cancellation, Notice Logic 370 may send notices to users that were scheduled for that flight. Further, VIP customers (e.g., users that paid more for their ticket) may receive notices prior to customers of lower priority. Notice Logic 370 is optionally configured to send notices over time or prioritization and/or load balancing purposes. For example, notices of a flight cancellation may be sent at times dispersed over a predesignated period (e.g., 45 minutes), thus some customers receive their notice prior to other customers and a notice rate (e.g., notices/hour) at which notices are sent is controlled.

In some embodiments, Notice Logic 370 is configured to send notices to Access Devices 110 in response to an availability of customer service agents at CRM Systems 120. This feature is optionally used to control the timing of customer service requests made to CRM System 120. For example, notices that are likely to result in a customer service request can be scheduled to be sent when customer service agents are available. If no customer service agents are currently available, or expected to become available in the immediate future, then notices may be delayed until customer service agents are likely to be available to handle the resulting customer service requests.

In a specific example, as a result of a flight cancellation Notice Logic 370 may be configured to send notices of the cancellation to customers scheduled to take the cancelled flight (a characteristic of the customers). Higher priority customers receive notices before lower priority customers. Notices are sent at a notice rate such that available customer service agents are able to handle the resulting customer service requests, without undue delay or a customer having to wait on hold for too long. In some embodiments, Notice Logic 370 is configured to send notices including proposed callback times. These callback times can be in order of customer priority and/or at times dispersed so as to manage the call load on customer service agents.

In some embodiments, Notice Logic 370 is configured to send notices to unavailable customer service agents, requesting that they make themselves available. For example, in response to an event such as a travel cancelation notices may be sent to the personal cell phones of off-duty customer service agents, requesting that they make themselves available for an expected surge in customer service requests.

Notices provided by Notice Logic 370 can include a menu customized as discussed elsewhere herein. For example, a notice may include a description of an event, and one or more possible customer responses including alternative ways of making a customer service request. In some embodiments, the menu included in a notice includes an option to automatically book an alternative flight or a hotel. Such menus are generated in real-time based on any characteristics of the customer and availability of various response/remedy types.

CRM System 120A optionally further includes Enhancement Logic 375 configured to enhance communication between CRM System 120A and Access Device 110A. Communication is enhanced by opening new (second) communication channels that typically have enhanced communication functionality relative to initial (first) communication channels. Enhancement Logic 375 may also assist with the provision of customer services and/or assist with authentication of Access Device 110A by simplifying the association of a contact made via the first communication channel to a user's account.

More specifically, Enhancement Logic 375 is configured to receive a communication from Access Device 110A via a first communication channel. As discussed herein, the first communication channel may be via a cellular telephone network, a PTSN, a SMS or MMS channel, and/or the like. The first communication channel may be established by calling a telephone number associated with CRM System 120A or sending a text message to CRM System 120A, for example. Enhancement Logic 375 is further configured to execute Application Logic 270 on Access Device 110A so as to open a second (new) communication channel between Access Device 110A and CRM System 120A.

The second communication channel is opened using an identifier of Access Device 110A and/or an identifier of the communication received via the first communication channel. For example, the second communication channel may be opened using data that includes a caller ID of Access Device 110A as well as an identifier of an account and/or user of Access Device 110A. Specifically, the second communication channel may be opened using a username (e.g., facebook login name), IMEI number, and/or user e-mail previously associated with a user's account. This information may be stored on Access Device 110A and thereby accessible to Application Logic 270. Enhancement Logic 375 is optionally configured to request this information by sending commands to Application Logic 270. The second communication channel typically has an enhanced communication functionality relative to the first communication channel.

The second communication channel is optionally opened between a device locally connected to Access Device 110A using an identifier stored on Access Device 110A. For example, the second communication channel may be opened using an address of a television set locally connected to a cellular phone. By opening the second communication channel to a locally connected device, the communication channel may be used to diagnose and/or execute Application Logic 270 on the locally connected device. For example, the second communication channel may be used by a customer service agent to capture a screen image or control a function of the locally connected device via Agent Interface 330.

Enhancement Logic 375 is optionally configured to control Application Logic 270 on Access Device 110A by sending an SMS or MMS message to Application Logic 270. This message can include links, universal resource locators, commands, a session ID, a caller ID, and/or any of the other identifying information discussed herein. This message is optionally sent via a third communication channel between Access Device 110A and CRM System 120A, e.g., a communication channel specifically for SMS messaging. The message sent to Application Logic 270 is optionally sent to a caller ID number or other identifier received as a result of a call made using the first communication channel.

Enhancement Logic 375 is optionally configured to keep both the first communication channel and the second communication channel open at the same time. This allows, for example, a user of Access Device 110A to communicate via voice with a customer service agent, while at the same time the customer service agent can control operation of Access Device 110A and/or a device locally connected thereto. Enhancement Logic 375 is optionally configured to direct the first and second communication channels to the same human customer service agent and/or the same Agent Interface 330. In some embodiments, Enhancement Logic 375 is configured to provide a link to Access Device 110A, the link being configured to provision all or part of Application Logic 270 to Access Device 110A.

CRM Systems 120 optionally further includes Account Identification Logic 380. Account Identification Logic 280 is configured to associate an identifier of Access Device 110A with an account of a user of Access Device 110A. This association is based on the various data received via the second communication channel. For example, if a user's account is indexed using a username or an e-mail address, the account may not include a user's telephone number. When a call is received from Access Device 110A the caller ID of this call may not be sufficient to automatically look up the caller's account. However, when the caller ID or information (session ID) identifying the call made via the first communication channel is received from Application Logic 270 via the second communication channel, the caller ID can be associated with the account information received via the same communication channel. The association is optionally saved in Client Data Storage 310 so that the next time a call is received from Access Device 110A the user's account can be automatically retrieved.

CRM System 120A may further includes Agent Application 390, which in turn includes Secure Communication Logic 392, Payment Logic 393, and Receipt logic 394, I/O 395, Synchronization Logic 395.1, Analysis Logic 396, Filter Conversion Logic 397, Parsing Logic 398, Buffer 399.1, and Microprocessor 399.2.

Agent Application 390 communicates with a client application, directing the client application to an address of Third Party System 140 for securely making payments. The Agent Application 390 is further configured to authenticate the confirmation of the payment. The Agent Application 390 may be further configured to receive data regarding the payment from the third party and to match the confirmation of the payment to the data regarding the payment. The Agent Application 390 may be further configured to automatically authenticate the client device (e.g., Access device 110A). The authentication includes identifying an account associated with the client device (e.g., Access device 110A).

Secure Communication Logic 392 is configured to set up a secure channel for communicating with Access Device 110A, the client device. The secure channel may involve using Transport Layer Security (TLS) or Secure Sockets Layer (SSL), which will be referred to as "SSL." The SSL may include a cryptographic protocol, which may involve encrypting data being sent with asymmetric keys or symmetric keys. A certificate may be sent to the client for the client to sign, which the client sends with messages, so as to verify that the data is coming from the client. There may be a separate handshake layer (for verifying that the intended recipient receives a message when a message is sent). The handshake layer may be used for exchanging keys and the transport layer may be used for sending data encrypted with the keys.

Payment Logic 393 sends a message to Access Device 110A causing Access Device 110A to establish a communication channel with Third Party System 140 for making a payment. The command of Payment Logic 393 is sent to one of the client's devices (e.g., Access Device 110A) in response to an input entered by a person via the Agent Interface 330. The command of Payment Logic 393 is sent, via I/O 395, to the client application via the I/O 395. The command is configured to initiate a payment to a third party, such as Third party System 140. The command may include a payment amount and an address of the Third Party System 140.

Synchronization Logic 395.1 synchronizes the time data from different remote communication devices (such as Access Devices 110), so that the sound data from the different communications device can be combined into one unified sound data.

Event Logic 395.2 adds indications of events (e.g., changes in volume, completion of a sale, or changes in customer service agents, for example) to the unified sound data or unified sound and time data.

Analysis Logic 396 is configured to detect sentiment in at least the first sound data. Analysis Logic 396 analyzes the tone of the voice to determine the sentiment of the speaker. For example, Analysis Logic 396 may determine whether the speaker sounds happy, sad, angry, skeptical, scared, apprehensive, terrified, or inappropriate, for example. Analysis Logic 396 is configured to generate a score of a customer support session using the first sound data and the second sound data and optionally the first and second clock data. In an embodiment, a real-time score is reported to user of the remote communication device.

Voice Conversion Logic 397 converts the voices to an indication of a likely sentiment, such as a likely emotional state, which may include angry, happy, worried, scared, sad, depressed, or inattentive (or other emotions).

Parsing Logic 398 parses the words spoken by the user to provide an automated reply, to help determine the sentiment of the user. For example, certain word or expressions are more commonly used when the user is mad, such as "I hate you," if Parsing Logic detects a particular phrase, word, or combination of words commonly associated with a particular emotion, Parsing Logic 390 may determine that the user has that emotion or may enter a weight associated with that particular word and the emotion the word is associated with and place the weight in a formula that determines a probability that the user is in a particular emotional state or has a particular sentiment.

Filter Logic 399 removes personal information from the sound data, such as the name of the customer, contact information, identifying information, such as social security number, driver's license number, and/or car license number, for example.

Buffer 399.1 is configured to store the unified audio stream. Buffer 399.1 is configured to store the first sound data prior to sending the first sound data to a remote server (that is a server that is remote from any or all of the communication devices participating in a communication. Buffer 399.1 may temporarily store the unified audio stream that includes sound data having voices of each side of a conversation. Buffer 399.1 is a region of a physical memory storage used to temporarily store the unified audio stream, while the unified audio stream is received at a server of CRM System 120A.

CRM System 120A typically further includes a Microprocessor 399.2 configured by the addition of computing instructions to execute Authentication Logic 320, Forwarding Logic 350, Enhancement Logic 375, Pipeline Logic 360, and/or Agent Application 390, including Secure Communication Logic 392, Payment Logic 393, Receipt Logic 394, I/O 395, Synchronization Logic 395.1, Analysis Logic 396, Voice Conversion Logic 397, Parsing Logic 398, Filter Logic 399, and Buffer 399.1.

Figure 4:
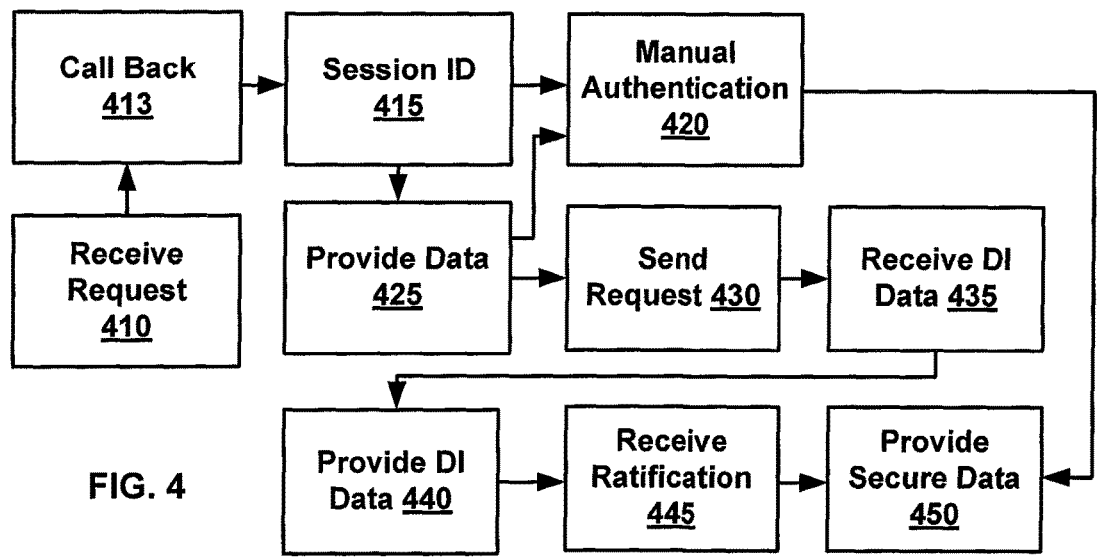
FIG. 4 illustrates a method of managing a customer service request, according to various embodiments of the invention.

FIG. 4 illustrates methods of managing a customer service request, according to various embodiments of the invention. In these methods automatic authentication of an access device, e.g., Access Device 110A, is achieved by receiving digital identification data from the access device and ratifying the digital identification data using GateKeeper 125. Following authentication of the access device, access and/or use of secure customer data is enabled. The methods illustrated in FIG. 4 are optionally performed using CRM System 120A and GateKeeper 125.

In a Receive Request Step 410, a request to communicate is received at CRM System 120A from Access Device 110A. This request may be in the form of a phone call, an internet chat session (voice, video and/or text), and/or the like. The request is optionally generated by an application on Access Device 110A. This application (e.g., Authentication Agent 235) may be configured to communicate both voice and digital data, e.g., to CRM System 120A. In some embodiments, the request In an optional Call Back Step 413, a "callback" is received at Access Device 110A from CRM System 120A. Call Back Step 413 is not needed, for example, when a customer service agent is immediately available at CRM System 120A. The callback may occur at a scheduled time or when the next customer service agent is available. Whether a callback is required or not, associated data and voice channels are opened between Access Device 110A and CRM System 120A. These channels are associated in that the endpoints for each are fixed and changes in these endpoints can only be changed under the control of CRM System 120A (e.g., by Authentication Logic 320 or Forwarding Logic 350). A customer service agent communicating with a user of Access Device 110A is assured that the voice and data channels both originate at the same Access Device 110A—such that authentication over the data channel can be used to authorize communication over the voice channel. Call Back Step 413 is optionally facilitated by Scheduling Logic 265 and Pipeline Logic 360.

In an optional Session ID Step 415, a session ID is assigned to the request to communicate, e.g., to the communication session. The session ID typically includes a temporary value that expires when the communication session is terminated. In Session ID Step 415 the assigned session ID is optionally communicated to Access Device 110A.

In an optional Manual Authentication Step 420, Access Device 110A and/or a user of Access Device 110A is authenticated by a customer service agent. This authentication may be accomplished by the customer service agent asking the user one or more questions. Manual Authentication Step 420 is optionally performed in parallel to or prior to automated authentication of Access Device 110A. For example, Manual Authentication Step 420 may be performed in parallel with Steps 425-445 discussed below.

In an optional Provide Data Step 425, less secure or unsecured customer data is provided to Access Device 110A and/or to a customer service agent. This data includes information that does not require authentication of the Access Device 110A or the user thereof. For example, Provide Data Step 425 may include providing a customer name, account number and address to a customer service agent. Provide Data Step 425 may also include providing questions to the customer service agent, the questions being configured for manual authentication of the customer.

In an optional Send Request Step 430, a request for digital identification data is automatically sent to Access Device 110A. Send Request Step 430 is optional when the digital identification data is received along with the request in Receive Request Step 410. At Access Device 110A, this request is typically received by Authentication Logic 320.

In a Receive DI Data Step 435, the requested digital identification data is received at CRM System 120A or GateKeeper 125 from Access Device 110A. As noted elsewhere herein, the requested digital identification data may include biometric data, a unique device identifier, a password/PIN, and/or the like. The digital identification data optionally includes a combination of these data types to achieve multi-factor authentication. The digital identification data is optionally received in an encrypted form.

In a Provide DI Data Step 440, the digital identification data received in Receive DI Data Step 435 is provided to GateKeeper 125 for ratification. In embodiments wherein GateKeeper 125 is within CRM System 120A, Provide DI Data Step 440 may merely include transfer of the data between subroutines.

In a Receive Ratification Step 445, a ratification of the digital identification data is received from GateKeeper 125. This ratification completes an authentication of Access Device 110A. Note that if a ratification occurs on Access Device 110A using Access Control 220, then Receive DI Data Step 435 and Provide DI Data Step 440 are optional. The ratification received in Receive Ratification Step 445 is received from Authentication Agent 235 and may be based on a ratification performed by Access Control 220.

In a Provide Secure Data Step 450, secure customer data is provided to Access Device 110A and/or Agent Interface 330. Note that Provide Secure Data Step 450 can occur after either manual or automated authentication of Access Device 110A. Some embodiments require both manual and automated authentication prior to granting access to particularly secure customer data. In some embodiments automated authentication of Access Device 110A is achieved before an agent is included in the communication. In these embodiments, the agent need not spend time on authentication processes or may merely activate an authenticate request command.

Figure 5:
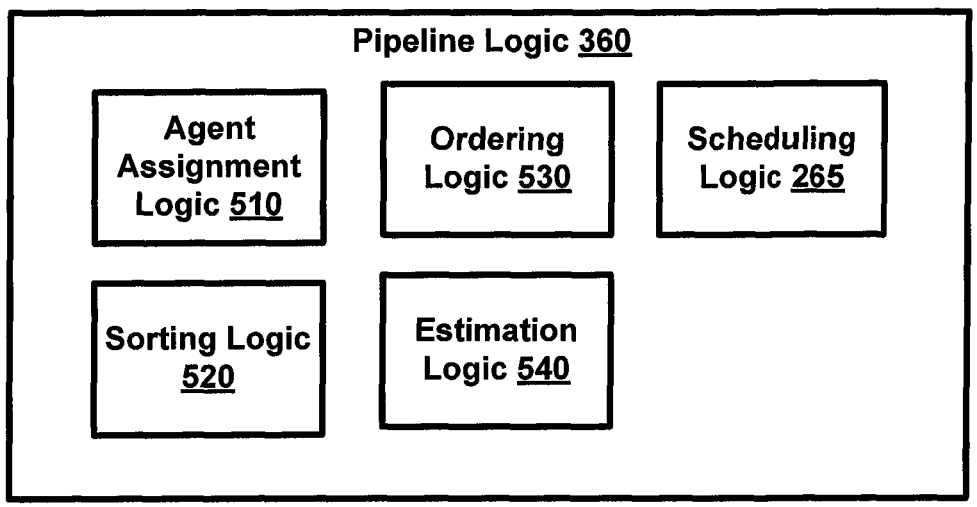
FIG. 5 illustrates further details of pipeline logic, according to various embodiments of the invention.

FIG. 5 illustrates further details of Pipeline Logic 360, according to various embodiments of the invention. Pipeline Logic 360 is distinguished, in part, by the ability to authenticate Access Devices 110 before the service request is received by a customer service agent. This authentication provides additional information that can be used to manage customer service requests. For example, the authentication can be used to automatically retrieve user account information, a callback number, a user's service history, a user's calendar, and/or the like. The operation and functionality of Pipeline Logic 360 is described with reference to FIG. 6.

Figure 6:
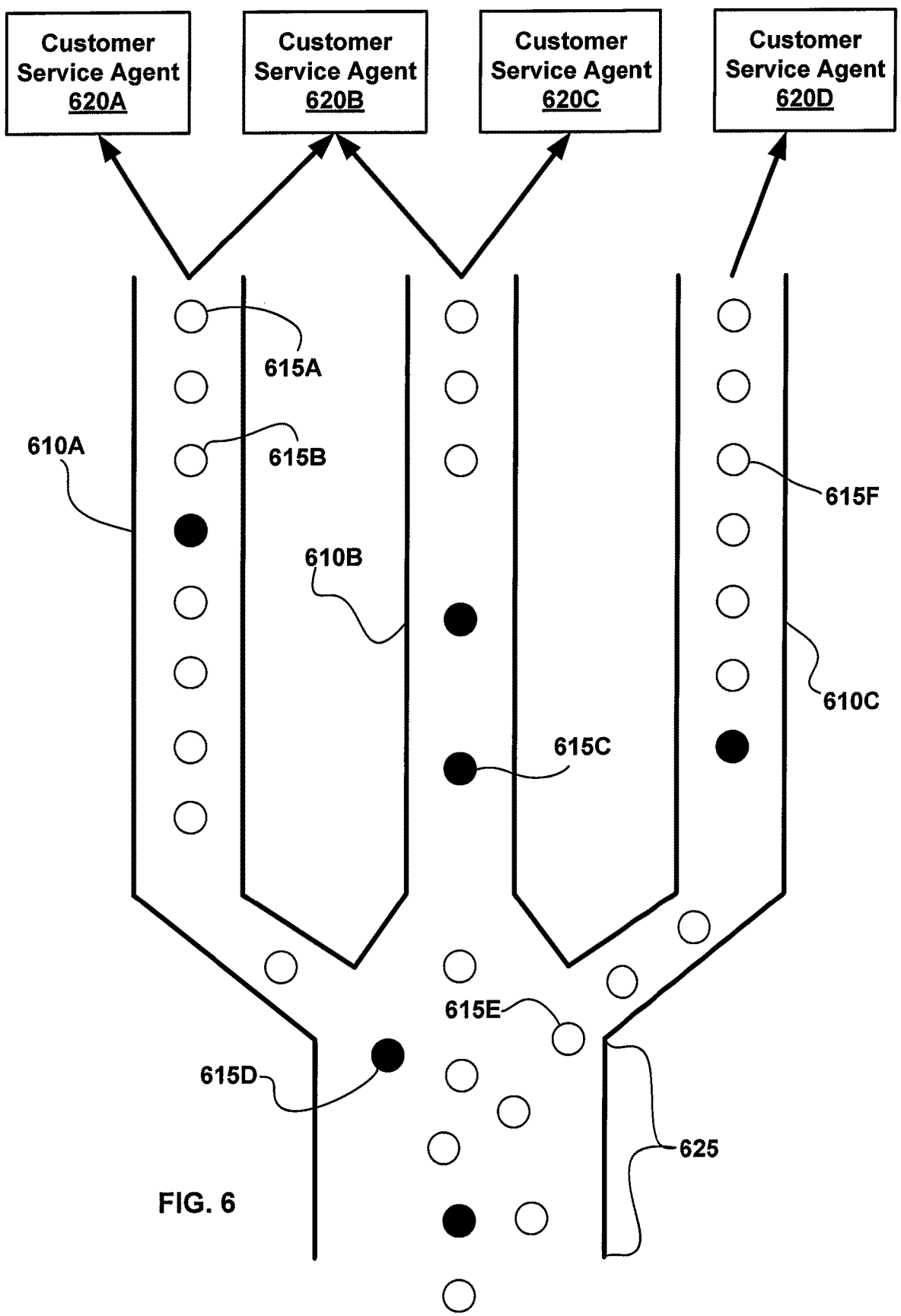
FIG. 6 illustrates request pipelines, according to various embodiments of the invention.

FIG. 6 illustrates Request Pipelines 610, according to various embodiments of the invention. Request Pipelines 610 are virtual representations of lists of Customer Service Requests 615 (individually designated 615A, 615B, etc.) Each of Request Pipelines 610 is assigned to one or more Customer Service Agents 620 (individually designated 620A, 620B, etc.) Customer Service Requests 615 are received at a Triage Zone 625 of Request Pipelines 610, from which they are sorted in to specific members of Request Pipelines 610. Request Pipelines are individually designated 610A, 610B, etc. Request Pipelines 610 and Triage Zone 625 are virtually representations of the processing of Customer Service Requests 615. In actual practice the Customer Service Requests 615 include data structures and data characterizing each request. The position of an individual member of Customer Service Requests 615 within the virtual structures illustrated in FIG. 6 can be represented by an ordered set of pointers, tags indicative of order, memory location, and/or the like. For example, the location of Customer Service Request 615F in FIG. 6 may represent a data tag indicating that it has been assigned to Request Pipeline 610C and a pointer indicating that it is in the third position within this queue. Customer Service Agents 620 represent human service agents and/or their respective computing devices. Typical embodiments include a greater number of Customer Service Requests 615, Request Pipelines 610 and Customer Service Agents 620 than are illustrated in FIG. 6.

Referring to FIGS. 5 and 6, Pipeline Logic 360 includes Agent Assignment Logic 510. Agent Assignment Logic 510 is configured for assigning Customer Service Agents 620 to members of Request Pipelines 610. To accept Customer Service Request 615, each of Request Pipelines 610 has at least one Customer Service Agent 620 assigned. As illustrated a member of Request Pipelines 610 may have one, two or more Customer Service Agents 620 assigned thereto. A particular member of Customer Service Agents 620 may be assigned to more than one of Request Pipelines 610.

In some embodiments, Agent Assignment Logic 510 is configured to dynamically assign Customer Service Agents 620 to Request Pipelines 610 in response to profiles of the Customer Service Agents 620 and the real-time status of Request Pipelines 610. This assignment can include the creation (allocation) and destruction (deallocation) of Request Pipelines 610. Examples of the criteria that may be used to select Customer Service Agent 620B for assignment to Request Pipelines 610A or 610B include: load balancing, workday schedule (e.g., breaks and time on/off) of Customer Service Agent 620B, skills and/or expertise of Customer Service Agent 620B, classification of the Request Pipelines 610A or 610B, number of scheduled Consumer Service Requests 615 (scheduled callbacks) assigned to Customer Service Agent 620B, other Customer Service Agents 620 available, and/or the like. For example, Customer Service Agent 620B may be authorized to reset passwords for online customers and may be assigned to Request Pipeline 610A because it is classified to include password requests. Customer Service Agents 620B may be assigned to Request Pipelines 610 automatically or manually.

Pipeline Logic 360 typically further includes Sorting Logic 520. Sorting Logic 520 is configured to receive Customer Service Requests 615 and assign these requests to specific members of Request Pipelines 610. Typically, each of Customer Service Requests 615 is assigned to a single one of Request Pipelines 610 on a 1-to-1 basis. The assignment of Customer Service Requests 615 is based, at least in part, on the classification of each of Request Pipelines 610. Request Pipelines 610 are classified by request type. For example, different members of Request Pipelines 610 may be classified as including Customer Service Requests 615 for account balances, for technical service, for password changes, for new accounts, for sales, etc. The purpose of a Customer Service Request 615 may be determined by a source of the request, by the customer selections made in a menu, by data entered on a web page, by parsing narrative text, by a destination address (e.g., URL or telephone number) of the request, and/or the like. A member of Request Pipelines 610 may have multiple classifications. Sorting Logic 520 is typically applied while a request is in the Triage Zone 625 illustrated in FIG. 6.

The assignment of Customer Service Requests 615 to one of Request Pipelines 610 is optionally based on whether the source of the request has been authenticated or not. For example, Request Pipeline 610B may be classified to receive Customer Service Requests 615 from authenticated sources and Request Pipeline 610C may be classified to receive Customer Service Requests 615 from unauthenticated sources. The authentication status of Customer Service Request 615A can change over time. If this occurs, the request may be transferred from one of Request Pipelines 610 to another of Request Pipelines 610.

If the source of Customer Service Request 615D is authenticated, then information regarding the account of a user may be used to assign the request to a specific member of Request Pipelines 610. This information regarding the account may only be available for authenticated sources/users. For example, the financial information or service history of a user may be available after authentication. VIP customers may have access to special Request Pipelines 610. This information can be used by Sorting Logic 520 to assign Customer Service Request 615D to a particular member of Request Pipelines 610. For example, the request may be assigned to a pipeline associated with a Customer Service Agent 620 that the requestor has dealt with previously, a Customer Service Agent 620 qualified to serve customers with an account balance in a certain range, and/or the like.

Pipeline Logic 360 typically further includes Ordering Logic 530. Ordering Logic 530 is configured to manage the order of Customer Service Requests 615 in Request Pipelines 610. For example, Ordering Logic 530 is configured to hand off the Customer Service Requests 615 in a first-in-first-out (FIFO) manner. Exceptions to the FIFO management of requests that are found in various embodiments are: 1) the insertion of scheduled callbacks into the Request Pipelines 610; 2) giving priority to Customer Service Requests 615 from automatically authenticated sources; and/or 3) giving priority to transferred Customer Service Requests 615. Ordering Logic 530 is optionally configured to dynamically modify the order of Customer Service Request 615 within Request Pipeline 610. Factors that can be used to determine order include, transferred calls, repeat calls, authentication of source, priority (VIP) customer status, account value, account balance, and/or the like.

A scheduled call-back is scheduled for a specific time or time range. Call-backs are based on Customer Service Requests 615 that are not immediately serviced and requested by the customer to occur at a specific time or within a time range. As noted elsewhere herein, Scheduling Logic 265 may be used to schedule a call-back. In FIG. 6, scheduled Customer Service Requests 615 are indicated by a solid circle while non-scheduled Customer Service Requests 615 are indicated by an open circle. In some embodiments, the source of a Customer Service Request 615 must be authenticated before a call-back can be scheduled.

The authentication of a source of Customer Service Request 615E can occur when Customer Service Request 615E is first received, when Customer Service Request 615E is in Triage Zone 625 and/or when Customer Service Request 615E is in one of Request Pipelines 610. In some embodiments, Customer Service Request 615E may be moved from one of Request Pipelines 610 to another of Request Pipelines 610 based on successful authentication of its source.

Pipeline Logic 360 typically further includes Estimation Logic 540. Estimation Logic 540 is configured to estimate the times that resolution of a Customer Service Requests 615 will take. For example, Estimation Logic 540 may estimate that resolution of Customer Service Request 615A will take 5 minutes. The estimation of how long servicing a request will take can depend on the same criteria used to place a request in one of Request Pipelines 610. Further, the estimation may be based on whether or not a source of the Customer Service Request 615 has been authenticated. Typically, requests from authenticated sources are expected to take less time than requests from un-authenticated sources. Further, the estimation may be based on historical request resolution times of a particular member of Customer Service Agents 620. Estimates made by Estimation Logic 540 are used to predict when a particular Customer Service Agent 620 will be available to respond to a scheduled Customer Service Request 615.

Figure 7:
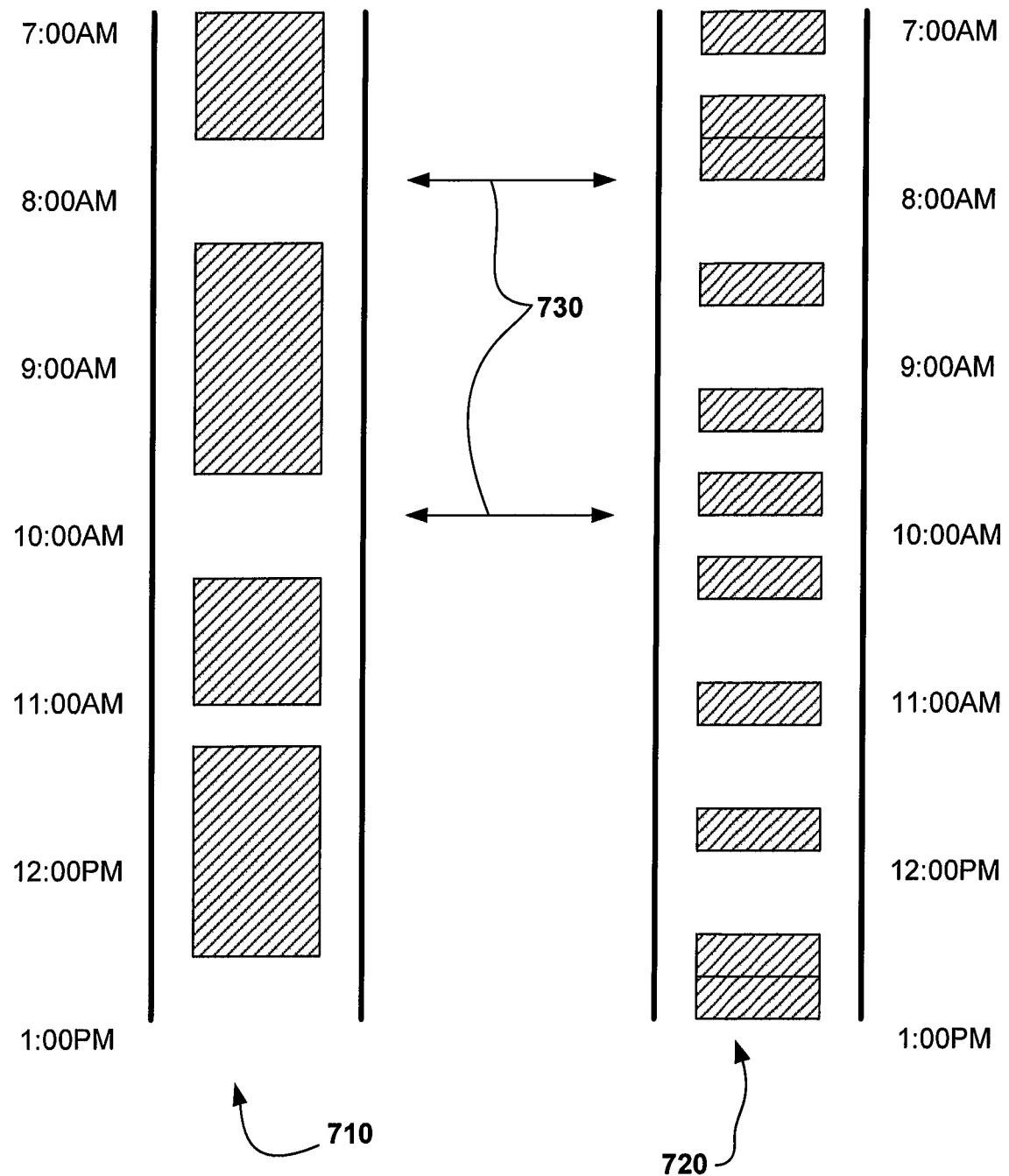
FIG. 7 illustrates schedule matching, according to various embodiments of the invention.

Pipeline Logic 360 typically further includes Scheduling Logic 265. As noted elsewhere herein, Scheduling Logic 265 is configured for scheduling a call-back. This scheduling may be automatic and be based on predicted availability of one or more Customer Service Agents 620A. The operation of Scheduling Logic 265 is illustrated by FIG. 7. FIG. 7 illustrates a Customer Schedule 710 and an Agent Schedule 720. Hash marks are meant to indicate unavailable times. Customer Schedule 710 may be derived from, for example, an outlook or Google calendar of the customer making the Customer Service Request 615. The Customer Schedule 710 may be derived from data retrieved from the source of the request. Agent Schedule 720 is derived from the schedules of one or more Customer Service Agents 620. Unavailable times are those for which no qualified Customer Service Agents 620. The Unavailable times may be based on estimates made using Estimation Logic 540, work schedules, previously scheduled call-backs, and/or the like. Scheduling Logic 265 is configured to automatically identify one or more Common Available Times 730 that are available on both Customer Schedule 710 and Agent Schedule 720. As discussed elsewhere herein, the Common Available Times 730 are optionally presented to the requestor.

Figure 8:
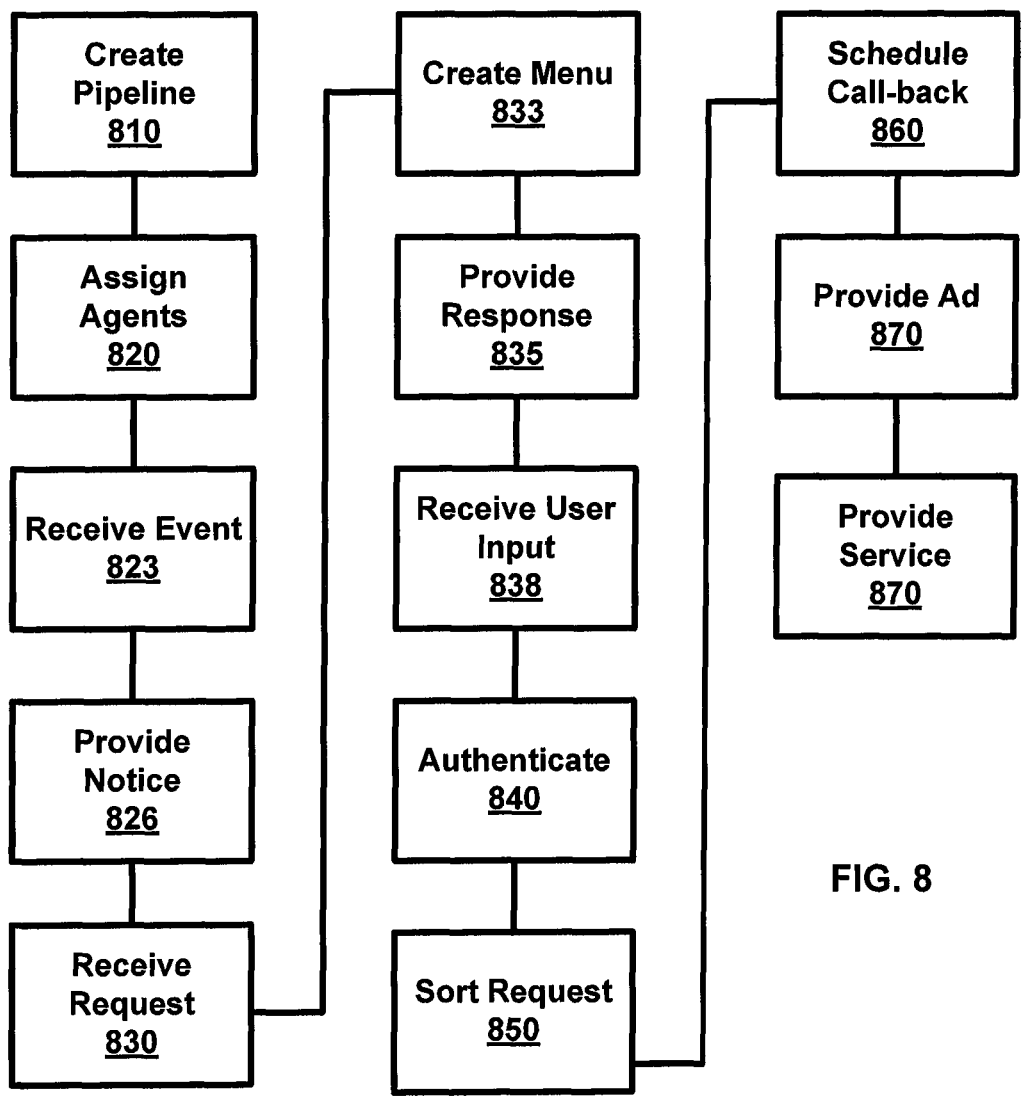
FIG. 8 illustrates methods of managing a customer service request, according to various embodiments of the invention.

FIG. 8 illustrates methods of managing Customer Service Requests 615, according to various embodiments of the invention. These methods may be performed using CRM System 120. The steps illustrated may be performed in a variety of alternative orders.

In a Create Pipeline Step 810 one or more Request Pipelines 610 is created. The created Request Pipelines 610 are each associated with specific characteristics to be used to determine if a specific Customer Service Request 615 should be placed in that Request Pipeline 610. As discussed elsewhere herein, these characteristics can include whether the source of the request has been authenticated, an identity of the customer making the request, data provided by the customer, etc.

In some embodiments, Create Pipeline Step 810 is automatically performed if a Customer Service Request 615 is received that does not match the characteristics of any currently available pipeline. The created Request Pipeline 610 may be represented in CRM Systems 120 by allocated pointers and/or allocated memory locations. Create Pipeline Step 810 is optional in instances where any needed Request Pipelines 610 are already allocated.

In an Assign Agents Step 820 one or more Customer Service Agents 620 are assigned to the Request Pipelines 610 created in Create Pipeline Step 810. As noted elsewhere herein, this assignment may be based on characteristics of the pipeline, authority, work schedule, and/or workload of the Customer Service Agents 620, number of Customer Service Requests 615 currently pending, etc. Assign Agents Step 820 is optional in embodiments in which Customer Service Agents 620 are previously assigned to current Request Pipelines 610. Assign Agents Step 820 is optionally performed using Agent Assignment Logic 510.

In an optional Receive Event Step 823 information regarding an event is received by Notice Logic 370. As discussed elsewhere herein, the event may be a change in travel schedule, an appointment availability/cancellation, a business offer (a sale), or any other occurrence that could result in a customer service request. The event can be received from a third party system and/or detected by Notice Lotic 370 by monitoring a remote data source. The event information is optionally received as a text or SMS message and can include an event identifier, a timestamp, location, metadata, a text description of the event, event data (e.g., flight number or stock price), source information, etc.

In an optional Provide Notice Step 826 notice of the event received in Receive Event Step 823 is provided to one or more of Access Devices 110. The notice can include any of the information that was received with the event. The notice can also include a menu customization generated based on any of the menu customization factors discussed elsewhere herein. Specifically, the notice typically includes a menu customization configured to give a user an option to make a customer service request and/or to take other actions in response to the event. Such actions may include rescheduling an appointment or trip, speaking with a customer service agent, scheduling a callback, making a financial transaction, etc. Provide Notice Step 826 is performed using Notice Logic 370.

In various embodiments, the timing and or content of notice provided in Provide Notice Step 826 is dependent on characteristics of a customer, availability of a customer service agent, a delivery or service schedule, and/or the like. Provide Notice Step 826 optionally includes sending notices to customer service agents, the notices requesting that they become available to handle customer service requests.

In a Receive Request Step 830 a Customer Service Request 615 is received from one of Access Devices 110. Receive Request Step 830 is an embodiment of Receive Request Step 410. The customer service request received in Receive Request Step 830 is optionally in response to a notice of an event provided in Provide Notice Step 826. For example, the customer service request may be initiated by a customer's selection in a customized menu that was included in a notice of an event.

In an optional Create Menu Step 833 a menu customization is created in response to the customer service request received in Receive Request Step 830. The menu customization may be created by Notice Logic 370, Authentication Logic 320, and/or Request Logic 365. As described elsewhere herein, the menu customization may include a fully customized menu or changes to a default menu. The menu customization can be based on characteristics of a customer (e.g., user of Access Device 110A), availability of a customer service agent having a specific specialty, an expected wait in Request Pipeline 610A, possible automated solutions to the customer service request (e.g., automated rebooking of travel), a delivery or service schedule, and/or the like.

In an optional Provide Response Step 835 a response to the customer service request received in Receive Request Step 830 is provided. The response is typically provided to the member of Access Devices 110 from which the customer service request was received, e.g., Access Device 110A. The response optionally includes a menu customization created in Create Menu Step 833 and/or a command configured to control Access Device 110A via Application Logic 270. The command may be configured to request input from the user of Access Device 110A, to activate input hardware on Access Device 110A, and/or to perform any of the other operations discussed herein.

The response is optionally sent in response to an action by a human customer service agent at Agent Interface 330. Specifically, in Provide Response Step 835 a customer service agent may execute an input on Agent Interface 330 that causes a command and menu customization to be sent to Application Logic 270. Thus, the customer service agent has direct control over the function and operation of Access Device 110A.

The customer service agent may require that the customer provide authentication data, a menu selection, an approval, and/or other information. Specifically, the response may include a request for an electronic signature, a fingerprint, a password, a photograph, a screen capture, and/or the like. The request may be in response to a real-time event, one or more characteristics of the customer, an authentication status of the customer (e.g., how well the customer has been authenticated), a location of Access Device 110A, a priority of the customer, and/or the like.

In an optional Receive User Input Step 838, a user input is received in response to Provide Response Step 835. The user input can include any of the information requested/required in Provide Response Step 835. For example, the user input can include a menu selection, biometric data, a confirmation/authorization, and/or the like.

The user input received in Receive User Input Step 838 is optionally processed by Application Logic 270 prior to being communicated to CRM System 120A. For example, Application Logic 270 may be used to compare a fingerprint received in real-time to previously stored fingerprint data, and to report results of this comparison to CRM System 120A. Likewise, a customer's answer to an authentication question can be compared with a previously stored answer, by either Application Logic 270 or Authentication Logic 320.

Create Menu Step 833, Provide Response Step 835 and Receive User Input Step 838 may occur at any time in the method illustrated in FIG. 8.

In an Authenticate Step 840 the source of the received Customer Service Request 615 is authenticated. The authentication may be performed as described elsewhere herein, for example, using Access Device 110A, CRM System 120A, and/or the steps illustrated in FIG. 4. Either or both the person (requestor) making the request and the Access Device 110 from which the request is sent may be authenticated.

In a Sort Request Step 850 the Customer Service Request 615 received in Receive Request Step 830 is assigned to one of Request Pipelines 610. This assignment is based on, for example, whether the request has been authenticated, information provided by the requestor, characteristics of the Request Pipelines 610, and/or any other of the criteria discussed herein. Sort Request Step 850 is optionally performed using Sorting Logic 520. Once placed in one of Request Pipelines 610, the position of the request within the queue is managed using Ordering Logic 530.

In an optional Schedule Call-back Step 860 a call-back for the Customer Service Request 615 is scheduled using Scheduling Logic 265. The scheduling is based on Agent Schedule 720 and optionally on Customer Schedule 710. Schedule Call-back Step 860 may make use of estimates of times required for a Customer Service Agent 620 to answer Customer Service Requests 615. For example, Scheduling Logic 265 may consider how long answering the Customer Service Request 615 for which a call-back is being scheduled will take to assure that the Customer Service Agent 620 is available for enough time. In another example, Scheduling Logic 265 may use an estimate of how long an unscheduled Customer Service Request 615 will take to assure that one of Customer Service Agents 620 is available for a scheduled call-back.

In an optional Provide Ad Step 870 Advertising Server 130 is used to select and provide an advertisement to the source (e.g., member of Access Devices 110) from which the Customer Service Request 615 is received. The selection of the advertisement is optionally based on information available only after the source is authenticated in Authenticate Step 840. For example, the advertisement selection may be based on the balance of a bank account or on a customer service request history of interactions between the source and CRM System 120A. As discussed elsewhere herein, the advertisement may be presented on Display 215. Provide Ad Step 870 optionally occurs while the Customer Service Request 615 is waiting in one of Request Pipelines 610.

In a Provide Service Step 880 the requested customer service is provided to one of Customer Service Agents 620, who then provides the requested service. This step typically occurs when the associated Customer Service Request 615 reaches the final position in one of Request Pipelines 610. As discussed elsewhere herein, the service provided may make use of data available (only) because the source of the request has been authenticated. Steps 833, 835 and/or 838 are optionally included in Provide Ad Step 870 and/or Provide Service Step 880.

Figure 9:
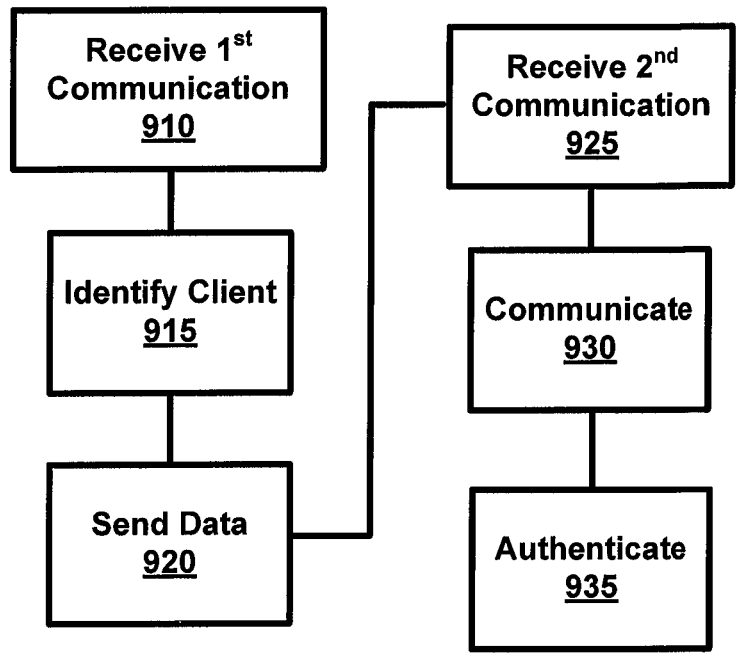
FIG. 9 illustrates methods of enhancing a communication channel, according to various embodiments of the invention.

FIG. 9 illustrates methods of enhancing a communication channel, according to various embodiments of the invention. These methods are optionally performed using the systems disclosed elsewhere herein. The enhancement occurs by adding at least a second communication channel having enhanced communication functionality relative to a first, original, communication channel. The second communication channel may be established using account information that was not available to the establishment of the first communication channel. In some embodiments, a relationship is established between a caller ID number of an access device and other account identifiers. The methods illustrated may be used to provide customer service to a user, or may be used to get web/cloud based services starting with a phone call or text message.

Figure 10:
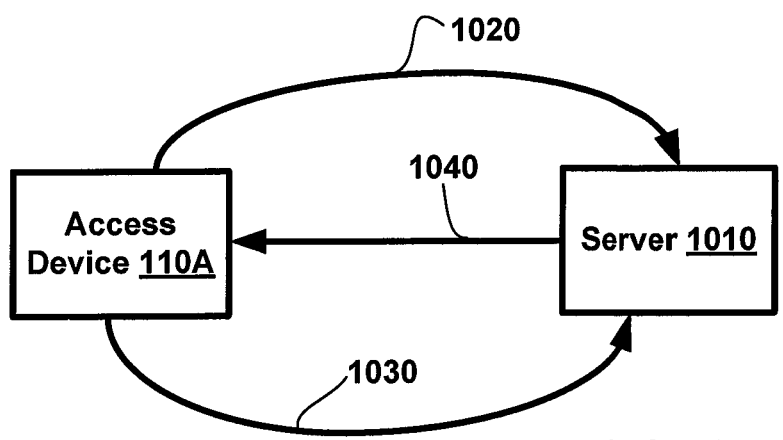
FIG. 10 illustrates the use of several communication channels between an access device and a server, according to various embodiments of the invention.

The steps illustrated in FIG. 9 are described with reference to FIG. 10. FIG. 10 illustrates the use of several communication channels between Access Device 110A and a Server 1010, according to various embodiments of the invention. Server 1010 may be any server configured to provide web/cloud services, and/or may include an embodiment of CRM System 120A. Server 1010 may include a system in which an API is configured to provide services to a remote client based on an expert system or other computing instructions (without necessarily or initially including a human agent). For example, the steps illustrated in FIG. 9 may allow a user to contact an airline reservation system starting with a simple call or text message. The communication between the user and the system is enhanced such that the user can use their mobile device to interact with the API of an automated reservation server and, when the user desires, the user can also interact with a human agent. The interaction with the human agent may be over the first and/or second communication channels. The user may interact with both the human agent and the API (application program interface) at the same time.

Referring to FIG. 9, in a Receive $1^{st}$ Communication Step 910, a first communication is received from a client, e.g., from Access Device 110A. The first communication may be received at Server 1010 or in a peer-to-peer situation at another member of Access Devices 110. The first communication is received via a first Communication Channel 1020, which is optionally a voice channel with limited functionality. For example, the first communication may be a PTSN or voice over IP call.

In an Identify Client Step 915, a source of the first communication is identified based on information received from the client via the first communication channel. In various embodiments, the information is a callerID number, MAC address, IP address, and/or the like. The information received may not be sufficient to positively identify an account of a user. For example, if the user's account is indexed using a username or e-mail address, the account data may not include a telephone number.

In a Send Data Step 920, activation data is sent to the client. The activation data is configured to control an application, e.g., Application Logic 270, on the client. The activation data typically includes an identifier of the first communication and/or the information received from the client via the first communication channel. For example, the activation data may include the callerID of Access Device 110A or a sessionID of the first communication. The activation data is configured to cause Application Logic 270 to open a second Communication Channel 1030 between Access Device 110A and Server 1010. This second Communication Channel 1030 typically includes enhanced communication functionality relative to the first Communication Channel 1020.

Send Data Step 920 optionally includes opening a third Communication Channel 1040 between Access Device 110A and Server 1010. For example, if the activation data is sent via an SMS message than an SMS channel may be opened based on a callerID identified in Identify Client Step 915. In some embodiments, Send Data Step 920 is not performed if the information received via the first communication channel 1020 is sufficient to identify the account of a user.

In a Receive $2^{nd}$ Communication Step 925, a second communication is received from the client via the second Communication Channel 1030. The second communication is initiated using an application executing on the client in response to the activation data. For example, the second communication may be initiated by Application Logic 270 in response to commands received in an SMS or MMS message received by Access Device 110A via third Communication Channel 1040.

In a Communicate Step 930, data is communicated between Access Device 110A and Server 1010 via the second Communication Channel 1030. This data may be directed to CRM System 120A and/or to an embodiment of Server 1010 configured to provide web/cloud services. For example, the data may include communications between Application Logic 270 and an automated reservation system executing on Server 1010. Note that using the steps illustrated in FIG. 9, access to web/cloud services can be initiated by a telephone call or text message from an enabled mobile device. These services can include provisioning of all or part of Application Logic 270 on Access Device 110A.

In an optional Authenticate Step 935, the second Communication Channel 1030 is used to provide authentication and/or other services discussed herein. These services can include, for example, those illustrated in FIGS. 4 and 8.

Several embodiments are specifically illustrated and/or described herein. However, it will be appreciated that modifications and variations are covered by the above teachings and within the scope of the appended claims without departing from the spirit and intended scope thereof. For example, the "customer service agent" discussed herein could be a "sales agent" or other personnel. While flights and other specific use cases are used in some of the examples herein, these it is intended that these examples may be adapted to any type of service that may involve access to a customer service agent, scheduled events, delivery, measurable provision of services, and/or the like. While many of the examples discussed herein include a client-server relationship between devices, these examples may be adapted to peer-to-peer relationships. For example, any combination of the features taught to be included in CRM System 120A are alternatively included in an instance of Access Devices 110 such that instances of Access Devices 110 interact in a peer-to-peer relationship.

FIG. 11 illustrates an example of an embodiment of Application logic 270. Application Logic 270 includes Client Application 1105 having Request Authorization Logic 1110, Provide Information Logic 1115, Command Logic 1120, and Receipt Logic 1130.

Client application 1105 is configured to execute on Access Device 110 (a client device) and to receive commands from an agent application, request payment authorization via the customer interface, and provide payment account details to the address of the Third Party System 140, in response to a payment authorization. Client application 1105 is configured to receive the confirmation of the payment from the third party and to forward the confirmation of the payment to the agent application. The confirmation of the payment may include an authentication certificate and/or may be encrypted.

Request Authorization logic 1110 requests authorization from Third Party System 140 to make a payment. The request for payment authorization made by Request Authorization 1110 includes an amount of payment and an identity of a payee. An authentication certificate may be sent with the payment amount and the address of the Third Party System 140. The request for authorization to make a payment includes the payment account details, which may include a credit card number, bank account number, debit card number, for example.

Provide Information Logic 1115 is configured to provide payment account details to the address of the third party, in response to the payment authorization.

Command Logic 1120 receives the command from the agent application, and implements the command. Command Logic 1120 may invoke Request Authorization to request authorization to place the call to request authorization to receive a payment.

Receipt logic 1125 waits to receive a confirmation of the payment. The confirmation of the payment is received, by Receipt Logic 1125, from the Third Party System 140. If a confirmation of the payment is received, receipt logic may store the confirmation and/or set a flag that the confirmation was received, indicating that the goods and/or service purchased may be delivered. The confirmation of the payment may include payment details, such as the amount of the payment, what the payment was for, and the account that the payment was taken from. Receipt Logic 1125 may check (1) that a confirmation was received confirming that a transaction occurred and (2) may check the information in the confirmation against the payment information sent for making the payment to verify that the correct transaction occurred.

Secure Communication Logic 1130 functions in the same manner as Secure Communication Logic 392, except that Secure Communication Logic 1130 resides in Client Application 1105 and Secure Communication Logic 392 resides in Agent Application 390.

FIG. 12 illustrates a flowchart for making a secure payment, without the customer service agent being exposed to sensitive client information. FIG. 12 shows three separate methods—one performed, via the Client Application 1105, by the Client System (which is Access Device 110A), one performed by the Agent Application 390 on CRM System 120A, and one performed by Third Party System 140. The three methods may be combined to form one methods, and any two of the methods maybe combined to form one method. For example, the method performed by the Agent Application 330 and the Client Application 1105 may be combined into one method. Additionally, in general although a particular step may be indicated as being performed by a particular one of Client Application 1105, CRM System 120A, and Third Party System 140, the step can be performed by any of the others. For example, although it may only make sense for the customer service agent to perform one particular step and for the client to form another, the system that logic resides on that performs that function, may reside on any of the Access Device 110A, CRM System 120A, or Third Party System 140, but still be controlled by the customer service agent or the client, as appropriate.

In step 1205, Agent Application 390, via Secure Communications Logic Agent Interface 330, sets up a secure communication line with Secure Communication Logic 392 (alternatively Secure Communication Logic 1125).

In step 1210, a message is sent, by Payment Logic 393, from the CRM system 120A to Access Device 110A. The message includes a command to make a payment via a Third Party System 140.

In step 1215, the command is received by Command Logic 1120. In step 1220, in response to receiving the command, Command Logic 1120 invokes Request Authorization Logic 1110, and as a result, Access Device 110A sends a request for payment authorization to Third Party System 140.

In step 1230, a determination is made, by Third party System 140, of whether the client is authorized to make a payment. If the client is not authorized, the method 1200 ends. If the client is authorized, the method proceeds to step 1235, where a payment authorization is sent by Third Party System 140 to the Access Device 110A.

In step 1240, the payment authorization is received by Access Device 110A, and in response in step 1245, Provide Information Logic 1115 is invoked, causing Access Device 110A to send information for making a payment to Third Party System 140, so that a payment can be made, via Third Party System 140, to CRM System 120A.

In step 1250, Third Party System 140 receives the payment information. In step 1255, a payment confirmation is sent from Third Party System 140 to Access Device 110A and received at Receipt Logic 1130. In an alternative embodiment, the payment confirmation is sent from Third Party System 140 to CRM system 120A and received at Payment Receipt Logic 394.

In step 1260, the payment confirmation is received, via I/O 210 Receipt Logic 1130, at Access Device 110A (in an embodiment in which the payment confirmation is sent to the CRM system, in step 1260, CRM system 120A receives the payment confirmation).

In optional step 1261, Third Party System 140 sends payment information to CRM System 120A so that CRM System 120A can verify that the payment and purchase were made. The information sent includes enough information so that CRM System 120a can verify that the correct amount was paid and the intended item or service was purchased. For example, the information sent in step 1261, may include the amount paid and a code associating the payment with the customer that paid.

In step 1263, CRM System 120A receives the payment information that was sent, at Payment Receipt Logic 394, via I/O 395. Although payment information is received at CRM System 120A, the customer service agent is not shown any credit card, bank accounts or other information that the customer may want to keep confidential. In step 1265, Access device 110A sends the payment confirmation, via Receipt Logic 1125, to CRM System 120A. In an alternative embodiment in which CRM System 120A receives the payment confirmation from Third Party System 140, at Payment Receipt 394, instead of from Access Device 110A, and CRM System 120A sends the payment confirmation, via Payment Receipt 394, to Access device 110A.

In step 1265, Access device 110A sends the payment confirmation, via I/O 210 and Receipt Logic 1125, to CRM System 120A In step 1275, the payment confirmation is received by Payment Receipt 394 and the I/O 395 of CRM System 120A (or in the alternative embodiment, the payment confirmation is received by the Access System 110A).

In step 1280, a determination is made, by Payment Receipt Logic 394, whether the customer associated with Access Device 110A has paid an adequate amount for the goods and services purchased. If the payment was inadequate, the method ends. Optionally, a message is sent, by Receipt Logic 394, to Access Device 110A indicating the payment was insufficient. If in step 1280, if it is determined, by Receipt Logic 394, that Agent Application 330 of CRM System 120A was adequate, method 1200 proceeds to step 1285. In step 1285, goods and services are provided to the customer associated with Access Device 120A. For example, Receipt Logic 394 may automatically send the goods or services (e.g., if the delivery system is robotic or a computer product that can be downloaded or sent by a computer network), send a message to deliver the goods or services, allow the customer access to a portion of CRM System 120A where the good or service can be used or downloaded, or set a flag indicating that payment was received and that the goods or services can be delivered.

Figure 13:
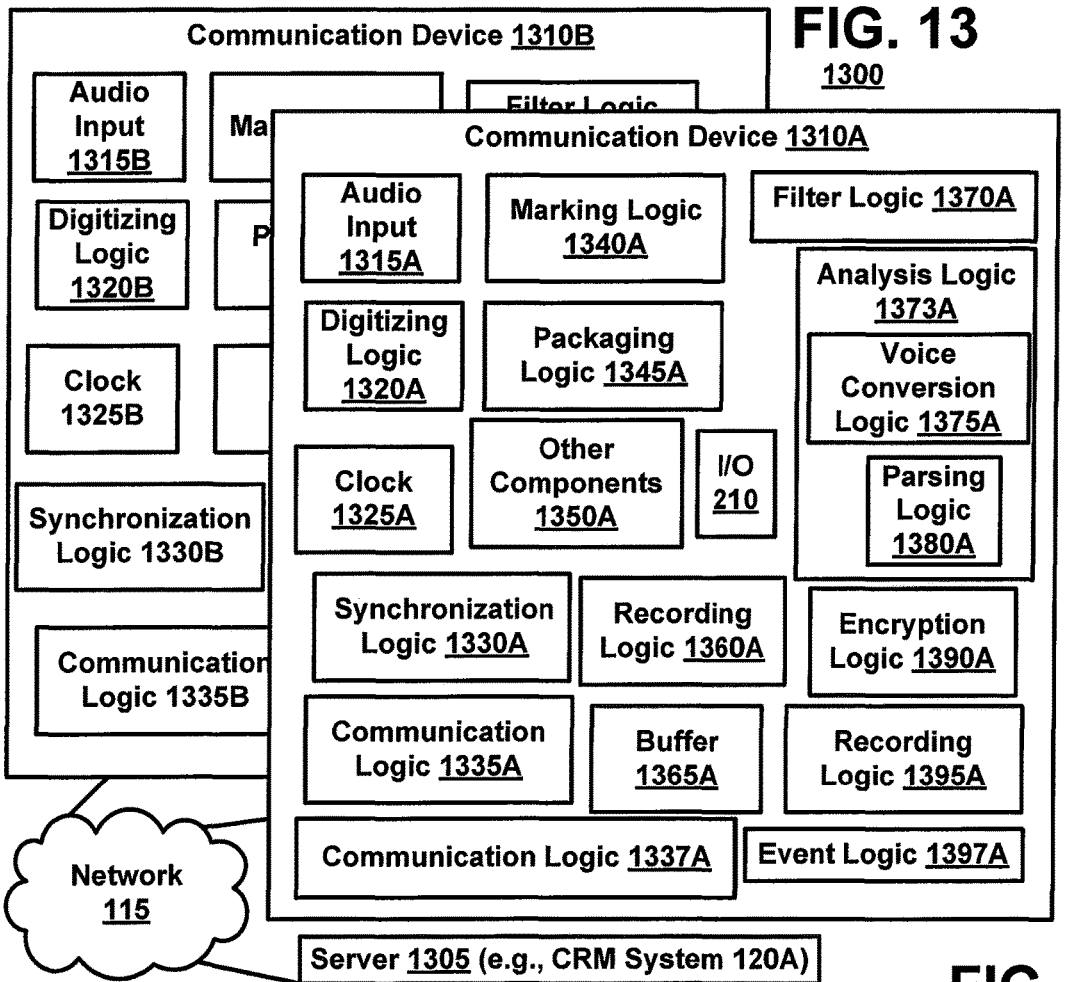
FIG. 13 illustrates a block diagram of an embodiment of the system of FIG. 1 for having peer-to-peer VoIP communications.

FIG. 13 illustrates a system 1300 for conducting Peer-to-Peer VoIP calls. System 1300 includes network 115, one or more servers 1305, and one or more communication devices 1310A, 1310B, etc. (which are collectively referred to as communication devices 1310).

FIG. 13 illustrates a Communication System 1300 configured to manage communication between multiple devices. FIG. 13 may be an embodiment of System 100, but is illustrated from a different perspective of System 100 (FIG. 1), emphasizing different aspects. Communication Devices 1310 may be used for having Peer-to-Peer VoIP communications. Communication Devices 1310 may be an embodiment of Access Devices 110 and/or may be communication devices associated with CRM Systems 120. For example, a customer of CRM System 120A and a customer service agent of CRM System 120A may communicate with each other, via Communication Devices 1310, after CRM System 120A routs a call from the customer to the customer service agent (alternatively, the customer can call on communication Device 1310B the customer service agent on Communication device 1310A, directly). Although any of Communication Devices 1310 may be used by a customer service agent or by a customer, in the example of FIG. 13, Communication Device 1310A is the communication device of a customer service agent that is in contact with a customer using Communication Device 1310B.

Communication Devices 1310 includes I/O 210, a first Audio Input 1315, Digitizing Logic 1320, Clock 1325, Synchronization Logic 1330, Communication Logic 1335, Marking Logic 1340, Packaging Logic 1345, Other Components 1350, Recording Logic 1360, Buffer 1365, Filter Logic 1370, Analysis Logic 1373, having Voice Conversion Logic 1375, and Parsing Logic 1380, Encryption 1390, and Recording Logic 1395.

Synchronization Logic 1330A, Buffer 1365A, Filter Logic 1370A, Analysis Logic 1373A, Voice Conversion Logic 1375A, Parsing Logic 1380A, and Event Logic 1397A have the same function as Synchronization Logic 395.1, Buffer 399.1, Filter 399, Analysis Logic 396, Voice Conversion Logic 397, Parsing Logic 398, and Event Logic 395.2, respectively, but are located on the Communication Device 1310A instead of Server 1305.

The first Audio Input 1315A may be a transducer that converts, sound into another form, such as electricity, light, another form of sound, or mechanical motion. For example, Audio Input 1315A may be a microphone or receiver of a telephone, smart phone, mobile phone, laptop, PC, or other device that may be used for communications. The user speaks into Audio Input 1315A when having a conversation. The first Audio Input 1315A is configured to receive a first sound signal (e.g., as a result of the customer service agent speaking). Optionally, the user may enter other types of sounds (e.g., music, noises, or other sounds) into Audio Input 1315A. Similarly, second Audio Input 1315B is configured to receive a second sound signal (e.g., from the customer speaking).

The first Digitizing Logic 1320A converts the output of Audio Input 1315A into a digital form. For example, Digitizing Logic 1320A may convert the output Audio Input 1315A into digital data. For example, Audio Input 1315*a* may convert sound into an analog electrical signal and Digitizing Logic 1320 may be an analog-to-digital (A/D) converter. The first Digitization Logic 1320 is configured to generate the first sound data by digitizing the received first sound signal. Similarly, second Digitization Logic 1320B is configured to generate the second sound data by digitizing the received second sound signal.

Clock 1325A keeps track of the time. The first Clock 1325A is configured to generate first time data. Similarly, a second clock 1325B is configured to generate the second time data. Clock 1325A may also produce a timing signal and may be the clock of Processor 290, for example. Alternatively, Clock 1325A may be a component that is independent of Processor 290. The time produced by Clock 1325A may be recorded in correlation to the Audio Input 1315A, so as to record the time at which different sounds were received. Each of the Clocks 1325 may have a slightly different time, due to a variety of possible reasons, such as each being in a different time zone, having a slightly different drift in its electronic circuitry, having different defects in each clock, and/or due to having been set to different times at the time of manufacture. Consequently, when comparing the times from different ones of Clocks 1325 with each other a determination needs to be made as to what formula transforms the time on one of Clocks 1325 to the time on another of Clocks 1325. For example, the times of each Clocks 1325A and 1325B may differ by an additive constant, and when comparing times, a determination of what additive constant is useful in determining the sequence of the receipt of sounds at different ones of Communication Devices 1310 may be made.

The Communication Logic 1335A communicates audio data produced from sounds received at Communication Devices 1310A and 1310B to a server 1305, where, in an embodiment, the two sets of sound information are combined into a unified stream of sound at Server 1305. Alternatively, the two sets of sound data could be combined at Communication Device 1310A. As another alternative, each Communication Device 1308 sends its own sound data to server 1305. The first Communication Logic 1335A is configured to communicate the first data message to the remote communication device, and to receive second sound data from the remote communication device the second sound data including the second time data generated on the remote communication device. Similarly, the second Communication Logic 1335B is configured to communicate the second data message to the communication device, and to receive the first data message from the communication device. The third Communication Logic 1347A is configured to send the first sound data and the time data to a remote Server 1305. The first sound data and the time data are sent by the third Communication Logic 1347A to the remote Server 1305, which in an embodiment occurs on an ongoing basis as the conversation or exchange of information between the customer and the customer service agent is in progress, in real-time.

First Marking Logic 1340A marks the signal produced by Audio Input 1315 or the sound data produced by Digitizing Logic 1320A with the time information produced by Clock 1325A, so that the sound data produced from sound entering Audio Input 1315A can be combined with sound data produced from sound entering Audio Input 1315B. The first Marking Logic 1340A is configured to add the first time data to the first sound data. Similarly, second Marking Logic 1340B is configured to add the second time data to the second sound data.

A first Packaging Logic 1345A packages the sound data into messages, which may include adding a header that includes information about the content of the message. Specifically, the header includes an identifier of the Communication Devices 1310 that contributed sound data to the message. For example, if the sound data is a conversation between Communication Devices 1310A and Communication Device 1310B identifiers of Communication Device 1310A and Communication Device 1310B or of the users of Communication Device 1310A and Communication Device 1310B may be included in the header, so the server can determine how (e.g., what label to use) to identify the sound generated by the sound data in the message. Alternatively, if the identity of the Communication Device 1310A that sent the message has already been determined (e.g., as part of the communications protocol) when sending the message only the identity of the Communication Device 1310B that is not sending the message needs to be included in the header. The first Packaging Logic 1345A is configured to place the first time data and the first sound data in a first data message, the first data message including an address of the remote communication device. Similarly, second Packaging Logic 1345B is configured to place the second time data and the second sound data in a data message, the data message including an address of the communication device. In other words, the message formed by Packaging Logic 1345A includes metadata. The metadata includes the address of one of the remote Communication Device 1310B. The metadata includes time data from the second Communication Device 1310B.

Other Components 1350A include other components commonly included in communication devices, the components of Access Device 110A (see FIG. 2) or any combination of the components of CRM System 120A.

A first Recording Logic 1360A records input into Communication Devices 1310. In an embodiment, Recording Logic 1360A is configured to combine the first sound data and the second sound data to produce a unified audio stream.

Encryption Logic 1390A is configured to encrypt at least the first sound data. Encryption Logic 1390A encrypts the messages sent between Communications Devices 1310 and between Communication Device 1310A and other communication devices. Encryption 1390A may encrypt and decrypt sound files and/or other files. The encryption may be performed by encrypting and decrypting the files with a symmetric key, encrypting files with a public key and decrypting files with a private key, and/or another encryption method. Recording Logic 1395A records sounds that are received at audio input 1315A. Recoding Logic 1395A may record an analog signal that is output by Audio Input 1315A or digital information representing the signal or a digitized version of the analog signal that is created by Digitizing Logic 1320A.

Recording Logic 1395A is a third recoding logic (Recording Logic 1360A is the first recording logic and Recording Logic 1360B is the second recording logic) configured to combine the first sound data and the second sound data to produce a unified audio stream. The Recording Logic 1365A is configured to use the first and second time data to temporally align the first and second sound data in the unified audio stream. Optionally, Recording Logic 1360A and 1395A may be the same Logic module. Optionally, Recording Logic 1395A may reside on Server 140 and CRM System 120A.

Figure 14:
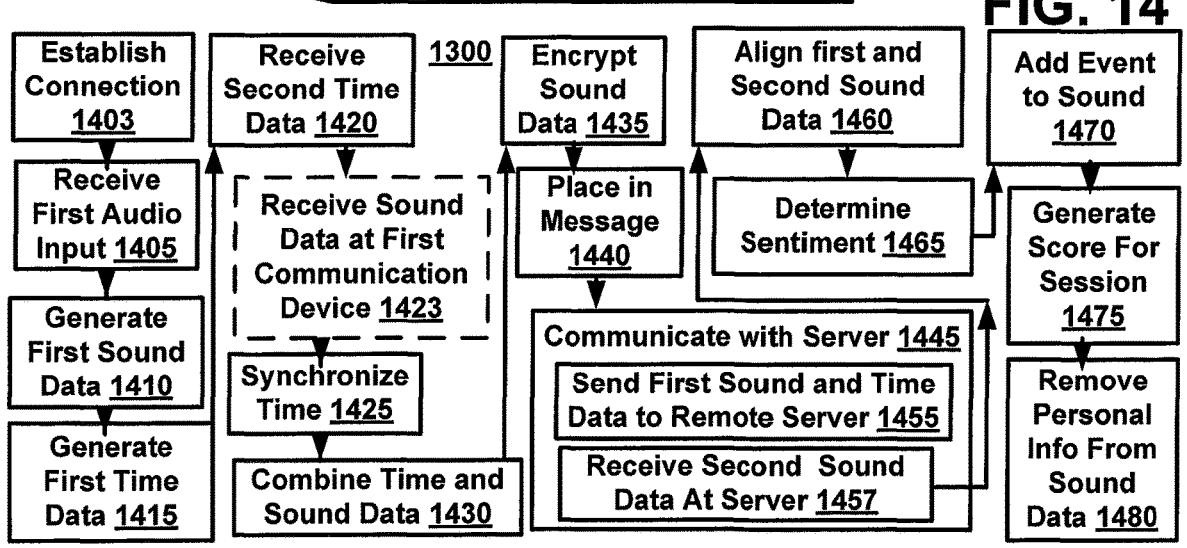
FIG. 14 illustrates a flowchart for having peer-to-peer VoIP communication.

FIG. 14 illustrates a flowchart of an embodiment of a method 1400 conducting a Peer to Peer VoIP communication. In step 1403, a connection is established between two or more of Communication Devices 1310. For example, a customer call is routed to a customer service agent, via Pipeline Logic 360 and/or Forwarding Logic 350, as described elsewhere in this specification or one party may directly dial a phone number of another party using a VoIP connection. From the point of view of the customer service agent (customer), a call is received at (a connection is established with) Communication Devices 1310A (1310B). Step 1403 is optional. The connection between Communication Devices 1310 may be established in any of a number of ways. After being connected to one another, Communication Devices 1310A and 1310B are connected, via a network, to one another, without requiring the communications to be routed through Server 1305.

In step 1405, a user, whom could be a customer service agent, a customer, or someone else, enters an audio signal into Audio Input 1315A (and consequently audio input is received at Audio Input 1315A). Audio Input 1315A may convert the signal into an electrical signal, an analog electrical signal, a mechanical signal, a light signal, or other signal. Similarly, audio input is entered into Audio Input 1315B.

In step 1410, a first set of sound data is generated, where the first sound data represents the sound received at Audio Input 1315A. For example, Digitizing Logic 1320A converts the output of Audio Input 1315A into a digital signal. For example, Digitizing Logic 1320 may discretize an analog signal output by Audio Input 1315A and/or may convert the analog signal into a binary stream of ones and zeros representing the sound that was received.

In step 1415, a first set of time data is received at Communication Device 1310A. For example, Clock 1325A periodically outputs the current time in correlation with the sound received at Audio Input 1315A. Also, second time data is received at Audio Input 1315B. For example, every 15 seconds the current time may be recorded, as input is received at Audio Input 1315A, and/or while a communication is occurring between Communications Devices 1310 in which Communication Device 1310A is involved.

In step 1420, a second set of time data is received from Communication Device 1310B and/or other Communication Devices 1310. The second set of time data represents the time at which various sounds were received by Communication Device 1310B and/or other Communication Devices 1310, based on Clock 1325B and/or the Clocks of other Communication Devices, respectively, participating in the communication. In an alternative embodiment, second time data is received at Server 1305.

In step 1423, a second set of sound data is received at communication Device 1310A from Communication Device 1310B and/or other Communication Devices 1310. The second set of time data represents the sounds that were received by Communication Device 1310B and/or other Communication Devices 1310. Optionally, the second set of sound data may come with the second set of time data. Optionally, the second set of sound data may be the same data or signals that produce the sound on the speakers of I/O 210 that the customer service agent listens to while conversing with the customer, which may be marked with the second set of time data. Step 1423 is optional, and the second sound data may be sent to Server 1305 instead of (or in addition to) Communication Device 1310A.

In step 1425, the times of the Clocks 1325 of the Communications Devices 1310 that are participating in the communication are synchronized, via Synchronization Logic 1330A. Specifically, transformations are determined that convert each of the times into a single representation of the time. For example, if just two communication devices are involved in an additive constant that may be determined to represent the difference in the time on Clocks 1325A and 1325B and the second set of times is converted to times that agree with Clock 1325A. Alternatively, the first set of time data is converted to times that agree with Clock 1325B or both the first time data and second time data is converted to a time of another of Clocks 1325 or the clock of server 1305, or another time. Since the second time data of Clock 1325B is received at Communication Device 1310A, and since the delay in receiving the second sound signal is relatively short, known, and constant, Synchronization Logic 1330A can reliably determine an offset between Clocks 1325A and 1325B. Communication received at Step 1425 may occur at Communication Device 1310A, 1310B, or Server 1305.

In step 1430, the time and sound data are combined, which is facilitated by Marking Logic 1340A. Marking Logic 1340A may mark the audio data output from Audio Input 1315A and/or Digitizing Logic 1320A with the time from Clock 1325A, as the sound is being entered with the time Audio Input 1315A. Step 1410-1430 may be performed concurrently, as the sound is being entered into Audio Input 1315A and 1315B. For example, the first set of time data is added to the first set of sound data and the second set of time data is added to the second set of sound data. Optionally, the second set of time data may be added to the first set of sound data and/or the first set of time data may be added to the second set of sound data. Alternatively, both sets of time data (after synchronization) may be combined and added to both the first set of sound data and the second set of sound data. For example, whichever part of either set of sound data is relevant to the first set of sound data is added to the first set of sound data and whichever part of either set of sound data is relevant to the second set of sound data is added to the second set of sound data.

In step 1435, the sound data is encrypted by Encryption Logic 1390A. For example, the combination of the sound data, with the time data added, is encrypted.

In step 1440, the encrypted sound data, is packaged, by Packaging Logic 1345A into a message with a header having metadata. The metadata of the header may include an identifier of Communication Device 1310B and/or any other Communication Device 1310 participating in the communication, with which Communication Device 1310A is also participating. Optionally, the identifier of Communication Device 1310B may be included in the packet header.

In step 1445, Communication Device 1310A communicates with Server 1305, and sends, via Communications Logic 1335A, the sound data and time data (e.g., the encrypted sound and data) to Server 1305. The communication may be sent over a Wide Area Network, such as the Internet or a local network (e.g., if the customer service agent is at the premises of CRM System 120A having server 1305).

In step 1455, the combined encrypted sound data with the time data is sent, by I/O 210, to the server and received by the Server 1305. Step 1455 may be part of step 1450 or step 1450 may establish the communication line, whereas and step 1450 may actually send the data to the server.

In step 1457, in an embodiment in which the first and second sound data are combined at server 1305, the second sound data is received at Server 1305 from Communication Device 1310A.

In step 1460, the first sound data and the second sound data are aligned by Alignment Logic at server 1305 at CRM System 120A, based on the first time data and the second time data.

In step 1465, a determination, by Analysis Logic 1373A is made of what is the sentiment (e.g., emotional state) of the customer, based on the tone of voice, words used, and/or other noise made. Step 1465 may involve Voice Converting Logic 1370A, which may convert the voice into values indicative of different emotions. Parsing Logic 1375A may parse the sound data to determine the usage of words that indicate different types of emotions.

In step 1470, a score is generated for the session, via Analysis Logic 396, so that the customer service representative can receive immediate feedback on the session. A weighted sum of values of representing various sentiments expressed, words used, and other criteria may be computed as the score. In an alternative embodiment, the score may be generated by Analysis Logic 1373A.

In step 1475, events are added to the sound data, via Event Logic 395.2 (or Event Logic 1397A). Step 1475 may be performed by the server 1305 or Communications device 1310A. For example, events may be added to the sound data, just after Event Logic 1397A after receives output from Audio Input 1315 or just after Digitizing Logic 1320 digitizes the sound. The events may be associated with the sound data and/or with the time data.

In step 1480, personal information of the customer is removed, via filter 399. The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

Computing systems referred to herein can comprise an integrated circuit, a microprocessor, a personal computer, a server, a distributed computing system, a communication device, a network device, or the like, and various combinations of the same. A computing system may also comprise volatile and/or non-volatile memory such as random access memory (RAM), dynamic random access memory (DRAM), static random access memory (SRAM), magnetic media, optical media, nano-media, a hard drive, a compact disk, a digital versatile disc (DVD), and/or other devices configured for storing analog or digital information, such as in a database. The various examples of logic noted herein can comprise hardware, firmware, or software stored on a computer-readable medium, or combinations thereof. A computer-readable medium, as used herein, expressly excludes paper. Computer-implemented steps of the methods noted herein can comprise a set of instructions stored on a computer —readable medium that when executed cause the computing system to perform the steps. A computing system programmed to perform particular functions pursuant to instructions from program software is a special purpose computing system for performing those particular functions. Data that is manipulated by a special purpose computing system while performing those particular functions is at least electronically saved in buffers of the computing system, physically changing the special purpose computing system from one state to the next with each change to the stored data. The logic discussed herein may include hardware, firmware and/or software stored on a non-transient computer readable medium. This logic may be implemented in an electronic device to produce a special purpose computing system.

What is claimed is:

1. A communication device comprising:
   one of a smart phone, a tablet or a personal computer, the smart phone, tablet or personal computer including a first audio input of the communication device configured to receive a first sound signal;

first digitization logic of the communication device configured to generate first sound data by digitizing the received first sound signal;

a first clock of the communication device configured to generate first time data;

first sync logic of the communication device configured to synchronize the first time data and second time data generated on a remote communication device by a second clock thereof, wherein the second time data is received by the communication device in order to synchronize the first clock of the communication device with the second clock of the remote communication device;

first marking logic of the communication device configured to add the first time data to the first sound data;

first packaging logic of the communication device configured to place the first time data and the first sound data in a first data message, the first data message including an address of the remote communication device;

first communication logic of the communication device configured to communicate the first data message to the remote communication device, and to receive second sound data from the remote communication device, the second sound data including the second time data generated on the remote communication device;

analysis logic configured to generate a score of a customer support session using the first sound data and the second sound data; and recording logic configured to combine the first sound data and the second sound data to produce a unified audio stream, the recording logic being configured to use the first and second time data to temporally align the first and second sound data in the unified audio stream.

2. The device of claim 1, further comprising third communication logic configured to send the first sound data and the first time data to a remote server.

3. The device of claim 2, wherein the third communication logic is configured to send the first sound data to the remote server in real-time.

4. The device of claim 2, further comprising a buffer configured to store the first sound data prior to sending the first sound data to the remote server.

5. The device of claim 1, further comprising encryption logic configured to encrypt at least the first sound data.

6. The device of claim 1, further comprising analysis logic configured to determine a sentiment of the first sound signal.

7. The device of claim 1, further comprising filter logic configured to remove personal identifying information from the first sound data.

8. The device of claim 7, wherein the filter logic is configured to remove the personal identifying information from the first sound data prior to communication of the first sound data to the remote communication device.

9. The device of claim 1, wherein the message includes metadata, the metadata including the address of the remote communication device.

10. The device of claim 1, wherein the message includes metadata, the metadata including time data from the second communication device.

11. A communication device comprising:
one of a smart phone, a tablet or a personal computer, the smart phone, tablet or personal computer including
a first audio input of the communication device configured to receive a first sound signal;
first digitization logic of the communication device configured to generate first sound data by digitizing the received first sound signal;
a first clock of the communication device configured to generate first time data;
first sync logic of the communication device configured to synchronize the first time data and second time data generated on a remote communication device by a second clock thereof, wherein the second time data is received by the communication device in order to synchronize the first clock of the communication device with the second clock of the remote communication device;
first marking logic of the communication device configured to add the first time data to the first sound data;
first packaging logic of the communication device configured to place the first time data and the first sound data in a first data message, the first data message including an address of the remote communication device;
first communication logic of the communication device configured to communicate the first data message to the remote communication device, and to receive second sound data from the remote communication device, the second sound data including the second time data generated on the remote communication device;
event logic configured to add events to the first sound data, the events being temporally indexed in the first sound data and including a change in parties participating in communication of which the first time data is a part, making of a payment, receiving an approval at the communication device, or a change in volume of the first sound signal; and
recording logic configured to combine the first sound data and the second sound data to produce a unified audio stream, the recording logic being configured to use the first and second time data to temporally align the first and second sound data in the unified audio stream.

12. The device of claim 11, further comprising third communication logic configured to send the first sound data and the first time data to a remote server.

13. The device of claim 11, further comprising encryption logic configured to encrypt at least the first sound data.

14. The device of claim 11, further comprising analysis logic configured to determine a sentiment of the first sound signal.

15. A method for communicating, via a voice over Internet Protocol (VoIP), the method comprising:
receiving, at a first audio input of a first communication device, a first sound signal;
generating first sound data, by first digitization logic of the first communication device, by digitizing the received first sound signal;
generating, by a first clock of the first communication device, first time data;
synchronizing, by first sync logic, the first clock with a second clock of a remote communication device by synchronizing the first time data to second time data generated on the remote communication device and received by the first communication device;
adding, by first marking logic, the first time data to the first sound data;
placing, by first packaging logic, the first time data and the first sound data in a first data message, and including an address of the remote communication device with the first data message;
communicating, by first communication logic, the first data message to the remote communication device;
receiving second sound data from the remote communication device, the second sound data including the second time data generated on the remote communication device;
generating, by analysis logic, a score of a customer support session using the first sound data and the second sound data; and
combining, by first recording logic of the first communication device, the first sound data and the second sound data to produce a unified audio stream, the first recording logic being configured to use the first and second time data to temporally align the first and second sound data in the unified audio stream, wherein the first communication device comprises one of a smartphone, a tablet, or a personal computer.

16. The method of claim 15, further comprising determining a sentiment of the first sound signal.

17. The method of claim 15, further comprising sending, using third communication logic, the first sound data and the first time data to a remote server.

18. The method of claim 15, further comprising encrypting, using encryption logic, at least the first sound data.

19. A method for communicating, via a voice over Internet Protocol (VoIP), the method comprising:
receiving, at a first audio input of a first communication device, a first sound signal;
generating first sound data, by first digitization logic of the first communication device, by digitizing the received first sound signal;
generating, by a first clock of the first communication device, first time data;
synchronizing, by first sync logic, the first clock with a second clock of a remote communication device by synchronizing the first time data to second time data generated on the remote communication device and received by the first communication device;
adding, by first marking logic, the first time data to the first sound data;
placing, by first packaging logic, the first time data and the first sound data in a first data message, and including an address of the remote communication device with the first data message;
communicating, by first communication logic, the first data message to the remote communication device;
receiving second sound data from the remote communication device, the second sound data including the second time data generated on the remote communication device;
combining, by recording logic, the first sound data and the second sound data to produce a unified audio stream, including using the first and second time data to temporally align the first and second sound data in the unified audio stream;
combining, by first recording logic of the first communication device, the first sound data and the second sound data to produce a unified audio stream, the first recording logic being configured to use the first and second time data to temporally align the first and second sound data in the unified audio stream, wherein the first communication device comprises one of a smartphone, a tablet, or a personal computer; and adding events, by event logic of the first communication device, the events being temporally indexed in the first sound data and including a change in parties participating in communication of which the first time data is a part, making of a payment, receiving an approval at the communication device, or a change in volume of the first sound signal.

20. The method of claim 19, further comprising sending, using third communication logic, the first sound data and the first time data to a remote server.

21. The method of claim 19, further comprising encrypting, using encryption logic, at least the first sound data.

22. The method of claim 19, further comprising determining, using analysis logic, a sentiment of the first sound signal.

\* \* \* \* \*